United States Patent
Nakakita et al.

(10) Patent No.: US 6,782,260 B2
(45) Date of Patent: Aug. 24, 2004

(54) SCHEME FOR REGISTRATION AND AUTHENTICATION IN WIRELESS COMMUNICATION SYSTEM USING WIRELESS LAN

(75) Inventors: Hideaki Nakakita, Kanagawa (JP); Yoshiaki Takabatake, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 502 days.

(21) Appl. No.: 09/987,880

(22) Filed: Nov. 16, 2001

(65) Prior Publication Data

US 2002/0061748 A1 May 23, 2002

(30) Foreign Application Priority Data

Nov. 17, 2000 (JP) .................................... P2000-351066

(51) Int. Cl.[7] .............................................. H04Q 7/20
(52) U.S. Cl. ............................... 455/435.1; 455/435.2; 455/411; 455/410; 380/247; 380/249; 713/171; 713/168
(58) Field of Search .......................... 455/435.1, 435.2, 455/411, 410; 380/247, 249; 340/5.8; 713/171, 167

(56) References Cited

U.S. PATENT DOCUMENTS

| | | | | |
|---|---|---|---|---|
| 5,077,790 A | * | 12/1991 | D'Amico et al. | ........... 380/249 |
| 5,812,667 A | * | 9/1998 | Miki et al. | .................. 380/249 |
| 6,192,474 B1 | * | 2/2001 | Patel et al. | ................. 713/171 |
| 6,249,867 B1 | * | 6/2001 | Patel | .......................... 713/167 |
| 6,408,175 B1 | * | 6/2002 | Park | .............................. 455/411 |
| 6,665,529 B1 | * | 12/2003 | Mills, Jr. | .................... 455/411 |
| 2002/0018569 A1 | * | 2/2002 | Panjwani et al. | ........... 380/247 |

* cited by examiner

Primary Examiner—William Trost
Assistant Examiner—Danh C Le
(74) Attorney, Agent, or Firm—Oblon, Spivak, McClelland, Maier & Neustadt, P.C.

(57) ABSTRACT

In the disclosed registration and authentication scheme, in the case of carrying out the registration and authentication of a wireless terminal with respect to a wireless base station provided inside the home, for example, a user of the wireless terminal must directly operate the wireless base station. For this reason, it is possible to prevent the registration and authentication of a wireless terminal of an external user who cannot easily operate the wireless base station, and thereby it is possible to realize the secure and easy registration and authentication processing even when the wireless communications are used.

20 Claims, 23 Drawing Sheets

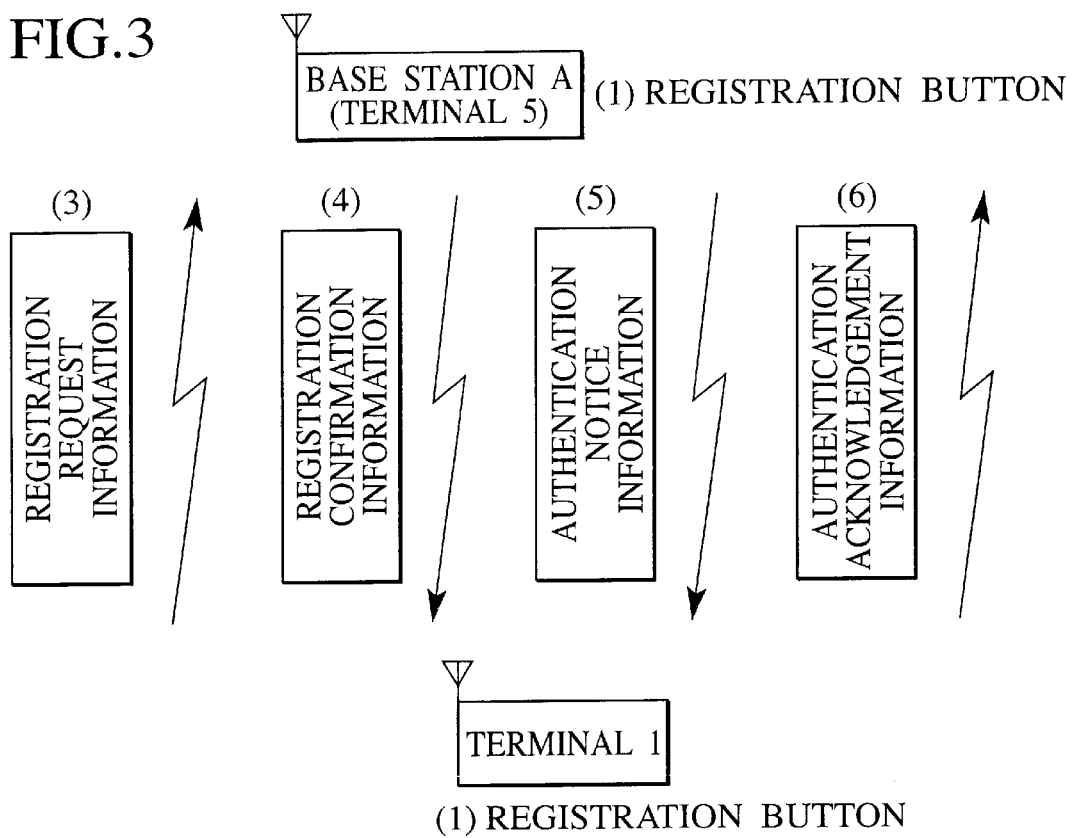

FIG.9

| BASE STATION A (TERMINAL 5) |
| SECRET KEY CRYPTOSYSTEM : SAsa |
| SECRET KEY : SKsa |

BASE STATION A (TERMINAL 5)
MAC ADDRESS : MA5
TERMINAL SPECIFIC INFORMATION : $\alpha 5$
PUBLIC KEY CRYPTOSYSTEM : AG5
PUBLIC KEY : PK5    SECRET KEY : SK5

TERMINAL 1
MAC ADDRESS : MA1
TERMINAL SPECIFIC INFORMATION : $\alpha 1$
PUBLIC KEY CRYPTOSTSTEM : AG1
PUBLIC KEY : PK1

⋮

TERMINAL n
MAC ADDRESS : MAn
TERMINAL SPECIFIC INFORMATION : $\alpha n$
PUBLIC KEY CRYPTOSYSTEM : AGn
PUBLIC KEY : PKn

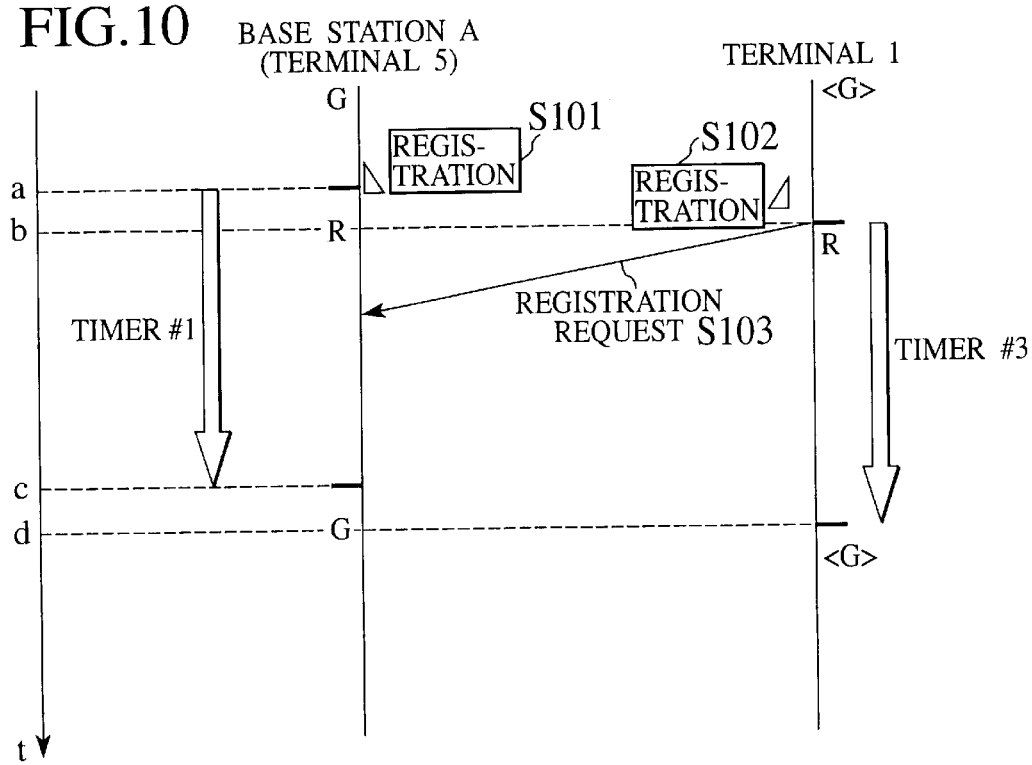

FIG.10

(1) REGISTRATION BUTTON
(2) REGISTRATION BUTTON
(5) AUTHENTICATION BUTTON

SCHEME FOR REGISTRATION AND AUTHENTICATION IN WIRELESS COMMUNICATION SYSTEM USING WIRELESS LAN

BACKGROUND OF THE INVENTION

1. Field of the Invention

The present invention relates to a technique for registration and authentication between a wireless base station and a wireless terminal in a wireless communication system using a wireless LAN formed by wireless terminals and wireless base stations, such as a wireless LAN system called IEEE 802.11 and the like.

2. Description of the Related Art

In recent years, in conjunction with the development of the LAN (Local Area Network) technique, the networking of the office environment centered around connections among PCs is in progress. While such a wired LAN is spreading, the use of a wireless LAN in which a part of the wired LAN is replaced by wireless is also in progress. For example, there is a case where a wireless base station is connected to the wired LAN and a plurality of portable PCs are connected to this base station by wireless. By using this portable PC for editing a file on a desk-top PC that is connected to the wired LAN through Ethernet, it is possible to realize the wireless access to the wired LAN. Also, a section comprising the base station and the portable PCs can be viewed separately as a wireless LAN. The advantages of such a wireless LAN include that the cable laying is unnecessary as radio or infrared paths are utilized for transmission, and that a new construction or layout change of network is easy.

The introduction of such wireless LANs is now accelerated after the standardization of IEEE 802.11. In IEEE 802.11, the wireless LAN specification using 2.4 GHz band is completed in 1997, and the wireless LAN specification using 5 GHz band is completed in 1999. The transmission rates of the wireless LAN specification using 2.4 GHz band include 1 to 2 Mbps and 11 Mbps, and the additional specification with the transmission rate of over 20 Mbps is currently under the discussion. Recently, products based on this 2.4 GHz band specification are put on the market by various companies and prices of the base station and the wireless PC card are now going down to a range that enables the wider spread. Also, unlike the 2.4 GHz band, the 5 GHz band is a nearly unused frequency band that is currently utilized only for the meteorological radar and it is expected that the faster transmission rate is realizable easily, so that it is a promising candidate for the next generation wireless LAN specification.

Also, recently, there is a trend for implementing the Bluetooth in all kinds of devices, including those of the portable telephone industry, the home electronics industry and the PC industry. This Bluetooth is also a wireless system using 2.4 GHz band which is now expected to spread worldwide because of the low cost of about $5 per chip and the backing of approximately 2000 companies in various industrial fields.

Under such circumstances, the spread of the wireless LAN system is expected to take place not only in the office environment but also in the general home. Consequently, it is expected that the environment in which a plurality of wireless LAN systems are existing contiguously or coexisting in the same space will be built widely in near future.

Now, in IEEE 802.11, the authentication processing between the wireless terminals or between the wireless base station and the wireless terminal is specified (the chapter 8 of the IEEE 802.11 specification).

This specification describes a scheme in which two entities (two wireless terminals, or a wireless base station and a wireless terminal) that are targets of the authentication processing will carry out the authentication by using the same secret key (common key) while also carrying out the secret communications (but this authentication processing is optional). For this authentication processing, the algorithm called WEP (Wired Equivalent Privacy) will be used. It is only stated that the distribution of the secret key will be carried out by a secure method in advance. Also, the secret key is to be provided with respect to each two entities, so that a given wireless terminal must be provided with a secret key for every other wireless terminals within the system, and the secret keys in the order of a square of the total number of wireless terminals will be required in the system as a whole.

Here, the encryption and decryption in the WEP algorithm will be described briefly, and the authentication using this WEP algorithm will also be described. FIG. 31 shows an outline of the encryption processing by the WEP algorithm of IEEE 802.11. In FIG. 31, the processing for encrypting data to be transmitted is shown, and this data to be transmitted is referred to as a plaintext PT here.

First, at the transmitting side, CRC is generated from this PT, that is, ICV is generated. On the other hand, a key sequence KS is generated from a secret key Sk and an initial vector IV through a WEP random number generator. An exclusive OR of this KS and a concatenated {PT, ICV} is calculated after adjusting their length to be equal. The result of this exclusive OR is an encrypted text ET. Then, by combining this ET and IV with a control code, a WEP frame as shown in FIG. 32 is formed. The secret communications according to the WEP algorithm will be carried out by using this WEP frame.

FIG. 33 shows an outline of the decryption processing by the WEP algorithm of IEEE 802.11. In FIG. 33, the processing for decrypting received encrypted data is shown. In FIG. 33, when the receiving side receives the WEP frame, IV is extracted from that WEP frame, and entered into the WEP random number generator along with the secret key Sk, to generate the key sequence KS. This key sequence KS should be the same as the KS of FIG. 31 if IV is not altered. By taking the exclusive OR of this KS with the encrypted text ET within the frame, the plaintext PT and ICV can be decrypted. By carrying out the CRC check for this PT and the resulting ICV' is compared with the decrypted ICV to verify the correctness of PT. If ICV' and ICV are equal, it can be regarded that PT is received successfully.

FIG. 34 shows a sequence chart for the authentication processing according to the WEP algorithm of IEEE 802.11. FIG. 34 is for an exemplary case of carrying out wireless communications between a wireless base station (base station) and a wireless terminal (terminal) within a radio zone of this base station. In FIG. 34, the secret key Sk which is the common key is exchanged between the base station and the terminal in advance (step S1001). Then, first, the terminal transmits an authentication request frame to the base station by the wireless communication (step S1002). This authentication request frame describes that the authentication by the common key scheme is requested. Note that the secret key Sk is already distributed to both the base station and the terminal at the step S1001.

Next, if the base station accepts the authentication request, the base station generates a check text CT from this secret key Sk and an internally generated initial vector IV through the WEP random number generator (step S1003). Normally, this CT has the length of 128 bytes. The base station transmits the generated CT by the wireless communication (step S1004).

The terminal receives the CT as a plaintext, and encrypts the CT by the secret key Sk (Sk(CT)) according to the method of FIG. 31 described above (step S1005). Then, the terminal transmits the encrypted text containing this Sk(CT) to the base station by the wireless communication (step S1006).

Finally, the encrypted text transmitted from the terminal is verified at the base station (step S1007). If it is correct, the authentication completion frame in a success status is sent. Otherwise the frame in a failure status is sent (step S1008). This verification is carried out by checking whether Sk(Sk(CT)(=CT') obtained by decrypting Sk(CT) according to the method of FIG. 33 described above coincides with CT originally generated by the base station or not.

As described above, in conjunction with the spread of the wireless LAN system, the situation where a plurality of wireless LAN systems are existing contiguously or coexisting in the same area can possibly occur in the general home. Here, the exemplary case shown in FIG. 1 in which the home wireless communication systems are provided in two neighboring homes, A's home and B's home, within an apartment complex will be considered.

In the example shown in FIG. 1, a wireless base station A is provided in A's home and a wireless base station B is provided in B's home. However, the covered areas of the base stations A and B may very well be extended beyond their respective homes. For example, from a viewpoint of the base station A of A's home, not only terminals 1 and 3 that belong to the A's home but also a terminal 2 located outside or a terminal 4 in B's home are also existing within the covered area of the base station A. But the terminal 2 located outside and the terminal 4 in B's home are not terminals belonging to A's home so that even if there is a registration and authentication request from the terminal 2 or 4, there is no need for the base station A to carry out the authentication with respect to the terminal 2 or 4. Namely, the base station A is required to carry out the authentication only with respect to the terminals 1 and 3 that belong to A's home.

Consequently, it is desirable for the base station A to manage the terminal registration and authentication such that the authentication will not be carried out with respect to the terminals other than the terminals 1 and 3 of A's home. The same is also true for the base station B of B's home.

Also, devices for use in the home are required to be connectable with each other even if they are manufactured by different manufacturers. In the wireless LAN such as IEEE 802.11 in which the manufacturer specific specification is permitted, the distribution of the secret key can be carried out at the step S1001 of FIG. 34. For example, it suffices to provide a built-in secret key in the base station and the terminal. However, in the home wireless communication system, there is a need for a separate mechanism to exchange the secret key between devices of different manufacturers by a secure and easy method using wireless communications.

SUMMARY OF THE INVENTION

It is therefore an object of the present invention to provide a wireless communication system for IEEE 802.11 or the like, which is capable of executing the registration and authentication between wireless terminals or between a wireless base station and a wireless terminal securely and easily.

According to one aspect of the present invention there is provided a method for registration and authentication of a wireless terminal with respect to a wireless base station in a wireless communication system having the wireless base station and the wireless terminal for carrying out wireless communications with the wireless base station, the method comprising: (a) switching a mode of the wireless base station from a normal mode to a registration mode, as a user operates the wireless base station; (b) switching a mode of the wireless terminal from the normal mode to the registration mode, as the user operates the wireless terminal; (c) transmitting a registration request information containing a terminal public key specific to the wireless terminal, a terminal encryption scheme using the terminal public key, and a terminal identifier of the wireless terminal, from the wireless terminal to the wireless base station; (d) upon receiving the registration request information at the wireless base station, transmitting a registration confirmation information indicating a registration of the wireless terminal, from the wireless base station to the wireless terminal, the registration confirmation information being encrypted by using the terminal public key and the terminal encryption method at the wireless base station; (e) switching the mode of the wireless base station from the registration mode to an authentication mode; (f) when the wireless terminal correctly decrypts the registration confirmation information by using a terminal secret key corresponding to the terminal public key, switching the mode of the wireless terminal from the registration mode to the authentication mode; (g) after the mode of the wireless terminal is switched to the authentication mode, transmitting an authentication notice information containing a base station secret key specific to the wireless base station, a base station encryption scheme using the base station secret key, and a base station identifier of the wireless base station, from the wireless base station to the wireless terminal, the authentication notice information being encrypted by using the terminal public key and the terminal encryption scheme at the wireless base station; (h) when the wireless terminal correctly decrypts the authentication notice information by using the terminal secret key, transmitting an authentication acknowledgement information indicating a receipt of the authentication notice information from the wireless terminal to the wireless base station, the authentication acknowledgement information being encrypted by using the base station secret key and the base station encryption scheme at the wireless terminal, and switching the mode of the wireless terminal from the authentication mode to the normal mode; and (i) when the wireless base station correctly decrypts the authentication acknowledgement information by using the base station secret key, switching the mode of the wireless base station from the authentication mode to the normal mode.

Other features and advantages of the present invention will become apparent from the following description taken in conjunction with the accompanying drawings.

BRIEF DESCRIPTION OF THE DRAWINGS

FIG. 3 is a diagram showing information to be exchanged between a base station and a terminal according to the registration and authentication sequence #1 shown in FIG. 2.

FIG. 4 is a diagram showing an exemplary content of a registration request information used in the registration and authentication sequence #1 of FIG. 2.

FIG. 9 is a diagram showing an exemplary content of a registration and authentication table to be provided at a base station in the wireless communication system of FIG. 1.

FIG. 10 is a sequence chart for explaining one exemplary timer operation in the registration and authentication sequence #1 of FIG. 2.

DETAILED DESCRIPTION OF THE INVENTION

Figure 1:
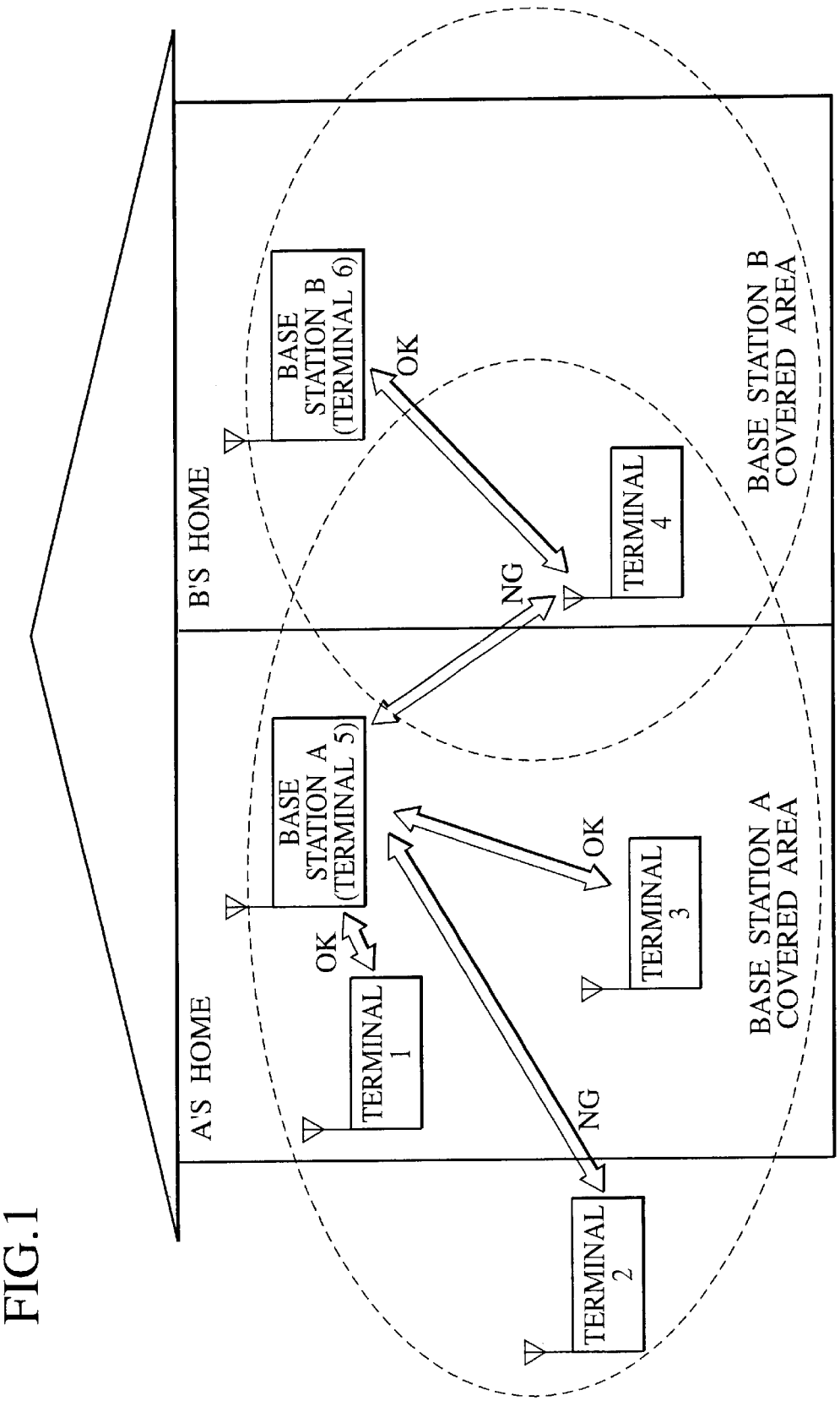
FIG. 1 is a schematic diagram showing one exemplary configuration of a wireless communication system according to the present invention.

Referring now to FIG. 1 to FIG. 30, the embodiments of the wireless communication system according to the present invention will be described in detail.

The present invention is mainly directed to the home wireless communication system. In this system, in terms of the management, the wireless base station carries out the registration and the authentication of the wireless terminal, and the ordinary data communications are carried out directly between terminals. The terminal is assumed to have an encryption scheme according to the public key cryptosystem and a secret key and a public key for that purpose. The public key cryptosystem can be the RSA cryptosystem or the elliptic curve cryptosystem, for example. The base station is assumed to have an encryption scheme according to the secret key cryptosystem and a secret key for that purpose. The secret key cryptosystem can be the DES scheme or the AES scheme, for example.

In the present invention, the registration is carried out first by the public key cryptosystem of the terminal, and then the authentication is carried out by the secret key cryptosystem of the base station. Consequently, in the present invention, the base station carries out the registration and the authentication of the terminals by using the same wireless communication scheme as the ordinary data, and as a result, the authenticated terminals can carry out the secret communications within the system by using the secret key cryptosystem managed by the base station.

By the present invention, it becomes possible to prevent an external terminal that has not been authenticated from eavesdropping communications within the system or pretending a terminal belonging to the system. Also, the present invention can be used as a method for distributing a secret key for data communications in advance which is presupposed in the WEP algorithm of IEEE 802.11. In that case, the terminal authentication according to IEEE 802.11 will be carried out by the WEP algorithm after utilizing the scheme of the present invention.

The base station is basically not much different from the other terminals in terms of functions except that it has a responsibility for the management of the home wireless communication system. In other words, when the terminal registration and authentication function is referred to as a base station function, a terminal which has this base station function can become the base station, and this concept is compatible with IEEE 1394. For this reason, in FIG. 1, for example, the base station A can be treated as a "terminal" (terminal 5) and the base station B can be treated as a "terminal" (terminal 6).

In the following, six embodiments of the wireless communication system according to the present invention will be described. The first to sixth embodiments are directed to the case where the base station A of FIG. 1 carries out the registration and authentication of the terminal 1.

It is the feature of the present invention that the terminal registration and authentication is carried out while a user checks states of the terminal and the base station by operating them both. For this reason, even though the wireless communications are used, it is possible to realize the terminal registration and authentication securely and easily. Namely, by requiring the user to operate the terminal and the base station, there is a need for the user to correctly follow sequences such as an order for pressing buttons.

Also, it is difficult to operate the base station A manually from outside of the home. For this reason, it is basically impossible for the base station A to register the terminal 2 or the terminal 4 of FIG. 1. Even when an attempt to carry out the registration and authentication of such an external terminal 2 or 4 is made by interfering with the registration and authentication of the terminal 1 or 3 of A's home, the user of A's home can easily detect such an attempt according to the state indication for the base station A or the terminal 1 or 3.

First Embodiment

Next, with references to FIG. 2 and FIG. 3, the first embodiment of the wireless communication system according to the present invention will be described.

Figure 2:
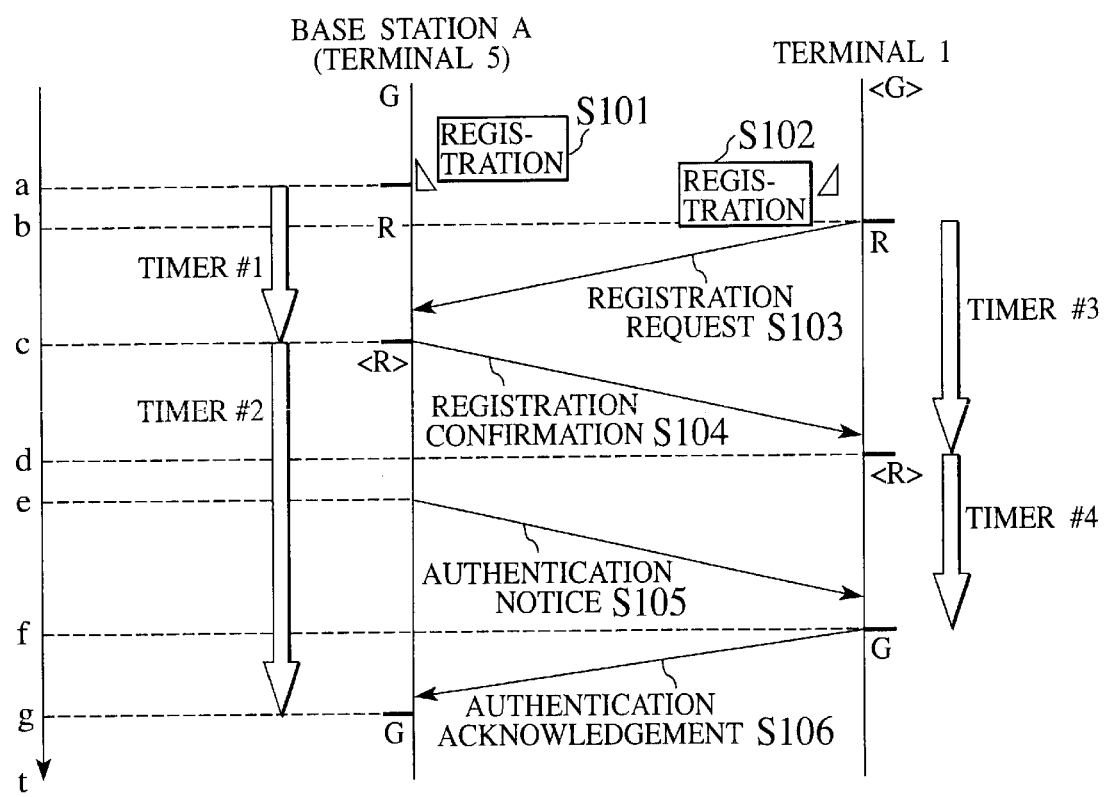
FIG. 2 is a sequence chart for a registration and authentication sequence #1 according to the first embodiment of the present invention.

FIG. 2 shows a registration and authentication sequence for the wireless communication system of the first embodiment.

Here, the registration and authentication sequence (registration and authentication sequence #1) between the base station A (terminal 5) and the terminal 1 of FIG. 1 is shown. This registration and authentication sequence #1 is largely divided into a registration stage and an authentication stage. Note that, in FIG. 2, it is assumed that the time t flows from a top to a bottom. These remarks also similarly apply to the sequences of the other embodiments to be described below.

FIG. 3 explains the registration and authentication sequence #1 of FIG. 2 by focusing attention on information to be exchanged between the base station A and the terminal 1. In FIG. 3, numerals in brackets indicate the sequential order in the registration and authentication sequence #1. In this registration and authentication sequence #1, a registration request information and an authentication acknowledgement information are transmitted from the terminal 1 to the base station A by the wireless communications. Also, a registration confirmation information and an authentication notice information are transmitted from the base station A to the terminal 1 by the wireless communications. In the following, this registration and authentication sequence #1 will be described with reference to FIG. 2.

The base station A has (1) a normal mode, (2) a registration mode, and (3) an authentication mode. Also, the terminal 1 has (1) two types of normal modes, i.e., a non-registered normal mode and a registered normal mode, (2) a registration mode, and (3) an authentication mode. Of course, there may be only one type of normal mode similarly as the base station A. In the case of using two types of normal modes, the registration of the terminal 1 is limited to just once, and as a result, the registration is possible only at one base station. In the case of using one type of normal mode, the registration of the terminal 1 is not limited to just once so that the registration is possible at a plurality of base stations.

Note that FIG. 2 uses the following notations regarding LED displays to be provided at the base station A and the terminal 1. "R" denotes the registration mode which will be indicated by the LED display with a red light on. "G" denotes the registered normal mode which will be indicated by the LED display with a green light on. "<R>" denotes the authentication mode which will be indicated by the LED display with a red light flashing. "<G>" denotes the non-registered normal mode which will be indicated by the LED display with a green light flashing. Note that there are other variations for the LED displays. For example, the authentication mode can be indicated by the LED display with a yellow light on. Also, in FIG. 2, triangular marks on the base station A and the terminal 1 indicate button operations by a user.

(a) First, the user operates a registration button on the base station A to switch the mode of the base station A from the normal mode to the registration mode (time "a", step S101). Also, a timer #1 is started at this point.

(b) Next, the user presses a registration button on the terminal 1 (time "b", step S102). In response to this operation, the terminal 1 transmits the registration request information to the base station A by the wireless communication (step S103). Also, when the registration button on the terminal 1 is pressed, a timer #3 is started. After this transmission of the registration request information, the mode of the terminal 1 is also switched from the normal mode to the registration mode. At this point, both the base station A and the terminal 1 are switched to the registration mode.

The registration request information to be transmitted by the terminal 1 contains a MAC address of the terminal 1, a public key and a public key cryptosystem of the terminal 1, and other information specific to the terminal 1 (device type, serial number, manufacturer, user name, etc.), as shown in FIG. 4.

The MAC address can be given by an EUI64 address or an EUI48 address of IEEE, which can uniquely identify the terminal 1. The EUI64 address is divided into first 24 bits and last 40 bits, where the first part is "CompanyID" assigned by IEEE and the second part can be freely used by the company to which this "CompanyID" is assigned. For example, the address such as AC-DE-64-00-00-00-00-80 (hexadecimal notation) can be used. In IEEE 1394, the EUI64 address is used as an address unique to a node (terminal). The EUI48 address is used for the Ethernet address and almost the same as the EUI64 address except that the second part has 24 bits. Also, by setting the first two octets of the second part of the EUI64 address as FF-FE (hexadecimal notation), it can be used as the EUI48 address format.

The public key and the public key cryptosystem are provided at the terminal 1 in advance. They can be written into a ROM or the like mounted on the terminal 1 itself at a time of the product shipment or written into a ROM of a wireless interface card of the terminal 1, for example.

The examples of the terminal specific information include a device type, a serial number, a manufacturer, a user name, etc. These informations may be managed in encoded forms. For example, the device type can be expressed in 4 bits, and it is decided in advance that 0000 indicates a wireless TV, 0001 indicates a digital VCR, 0010 indicates a note PC, and so on. The manufacturer can be similarly expressed by assigning in advance 00000 to Toshiba, 00001 to Sony, and so on.

(c) When the registration request information from the terminal 1 is received, the base station A returns the registration confirmation information to the terminal 1 (time "c", step S104). This registration confirmation information reports to the terminal 1 side that the registration of the terminal 1 at the base station A side is completed. At this point, the mode of the base station A is switched from the registration mode to the authentication mode. Also, a timer #2 is started. The registration confirmation information is encrypted by using the public key of the terminal 1 which is received from the terminal 1 through the registration request information. By this encryption, only the terminal 1 that requested the registration can read the contents of the registration confirmation information.

Figure 5:
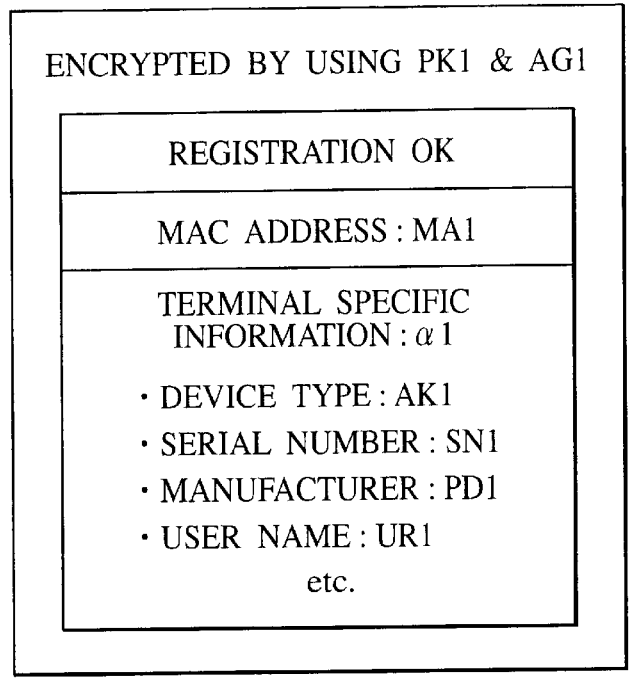
FIG. 5 is a diagram showing an exemplary content of a registration confirmation information used in the registration and authentication sequence #1 of FIG. 2.

This registration confirmation information contains a flag indicating that the registration is OK, the MAC address of the terminal 1 which is a target of the registration OK, and the terminal specific information, as shown in FIG. 5. These terminal MAC address and the terminal specific information are obtained from the registration request information of FIG. 4 described above.

(d) Upon receiving the registration confirmation information from the base station A, the mode of the terminal 1 is switched from the registration mode to the authentication mode (time "d"). At this point, a timer #4 is started.

Figure 6:
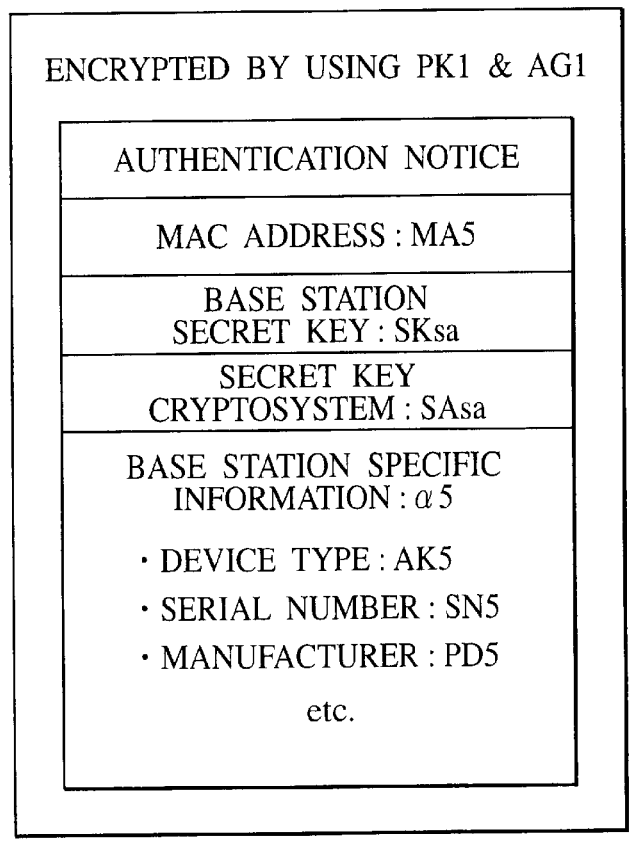
FIG. 6 is a diagram showing an exemplary content of an authentication notice information used in the registration and authentication sequence #1 of FIG. 2.

(e) After a prescribed period of time has elapsed since the timing for switching to the authentication mode (time "c"), the base station A transmits the authentication notice information to the terminal 1 (time "e", step S105). A relationship between the time "e" and the time "d" is set such that the terminal 1 can surely receive the authentication notice information while the terminal 1 is in the authentication mode. The authentication notice information contains an authentication notice, a MAC address of the base station A, a secret key and a secret key cryptosystem of the base station A, and information specific to the base station A, as shown in FIG. 6. Then, similarly as the registration confirmation information, this authentication notice information is encrypted by using the public key and the public key cryptosystem of the terminal 1. Only the terminal 1 has a secret key corresponding to the public key, so that the other terminals cannot check the authentication notice information intended for the terminal 1.

(f) When the terminal 1 receives the authentication notice information, the terminal 1 returns the authentication acknowledgement information to the base station A (time "f", step S106). At this point, the mode of the terminal 1 is switched from the authentication mode to the normal mode (indicated by the LED display with a green light on). If the terminal 1 was in the non-registered normal mode (indicated by the LED display with a green light flashing) at the beginning of the registration and authentication processing, the mode of the terminal 1 is switched to the registered normal mode (indicated by the LED display with a green light on). On the other hand, the mode of the base station A that was in the normal mode (indicated by the LED display with a green light on) at the beginning is switched back to the same normal mode.

Figure 7:
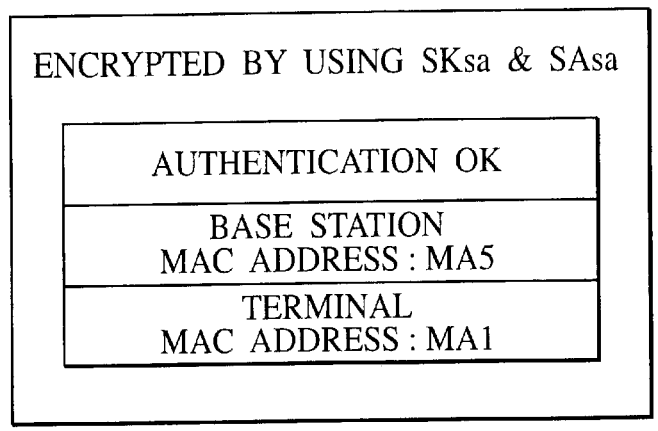
FIG. 7 is a diagram showing an exemplary content of an authentication acknowledgement information used in the registration and authentication sequence #1 of FIG. 2.

The authentication acknowledgement information contains an indication for the receipt of the authentication notice by the terminal 1 (authentication OK), the MAC address of the terminal 1 and the MAC address of the base station A, as shown in FIG. 7. These informations are encrypted by using the secret key and the secret key cryptosystem of the base station A and then transmitted to the base station A.

(g) When the authentication acknowledgement information from the terminal 1 is correctly decrypted, the mode of the base station A is switched from the authentication mode to the normal mode (time "g"). Here, if both the terminal 1 and the base station A are in the normal mode at the time "g", this terminal 1 is registered and authenticated at the base station A and the processing is completed.

Figure 8:
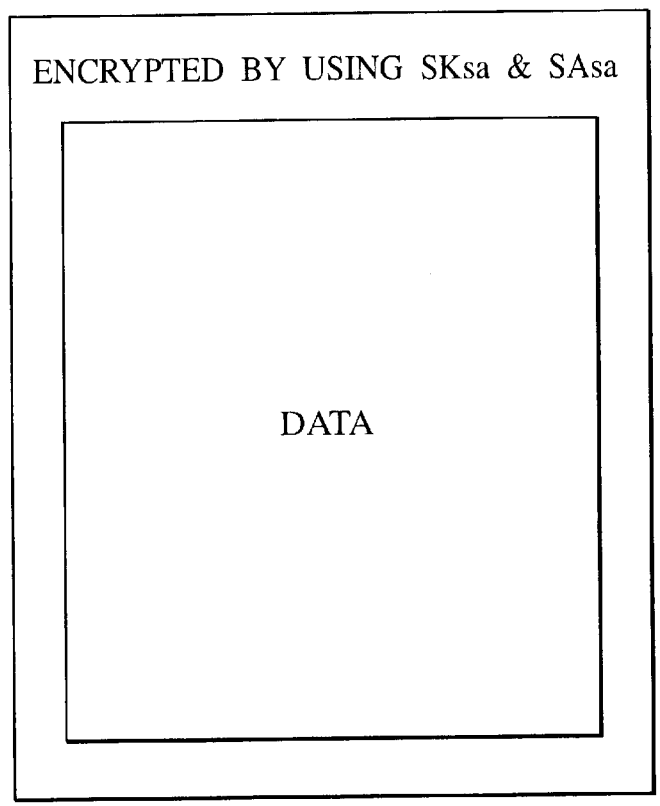
FIG. 8 is a diagram showing an exemplary form of communication data between terminals after the registration and authentication in the wireless communication system of FIG. 1.

The terminal 1 so registered and authenticated becomes capable of utilizing the secret key cryptosystem of the base station A in the home wireless communication system managed by the base station A, and carrying out the secret communications with the other already authenticated terminals. For example, the communication data between the terminals can be made secret as shown in FIG. 8. Namely, FIG. 8 is an exemplary case where the base station A manages the home wireless communication system, and the communication data are encrypted by using the secret key SKsa that is provided at the base station A in advance and the corresponding secret key cryptosystem SAsa. In this case, each terminal cannot read this secret communication data unless the registration and authentication at the base station A is carried out.

FIG. 9 shows the contents of a registration and authentication table to be managed by the base station A. In this registration and authentication table, the MAC address, the public key, the public key cryptosystem, and the terminal specific information of each terminal are recorded. These data for each terminal are obtained from the registration request information of each terminal shown in FIG. 4 described above. Of course, this table also contains the information on the base station A itself. The information on the base station A itself includes the secret key that is provided at the base station A in advance and the corresponding secret key cryptosystem. In addition, this information may also include the information necessary in the case where the base station A functions as a terminal, such as the MAC address, the public key and the secret key for the public key cryptosystem, the public key cryptosystem, and the other terminal specific information.

In the first embodiment described above, it is possible to handle the failure of the registration and authentication by using timers (timer #1 to timer #4) of FIG. 2, and set the base station A and the terminal 1 back to the normal mode. In the following, the timer operation in this case will be described with references to FIG. 10 to FIG. 14.

(1) FIG. 10 shows the sequence in the case where the terminal 1 transmitted the registration request information to the base station A but the base station A failed to receive this information successfully so that the registration confirmation information was not returned. In this case, at the base station A, the timer #1 is started at the time "a" but became time-out at the time "c" so that the mode of the base station A is switched back to the normal mode. On the other hand, at the terminal 1, the timer #3 is started at the time "b" but became time-out at the time "d" without receiving a response to the registration request information, i.e., the registration confirmation information, so that the mode of the terminal 1 is switched back to the normal mode. Because both the base station A and the terminal 1 are switched back to the normal mode without entering the authentication mode, it is possible to visually judge the failure. Also, by setting the limit time of the timer #1 and the timer #3 longer than the time required for the registration and authentication, it is possible to use the length of that time as a criterion for the visual judgement.

Figure 11:
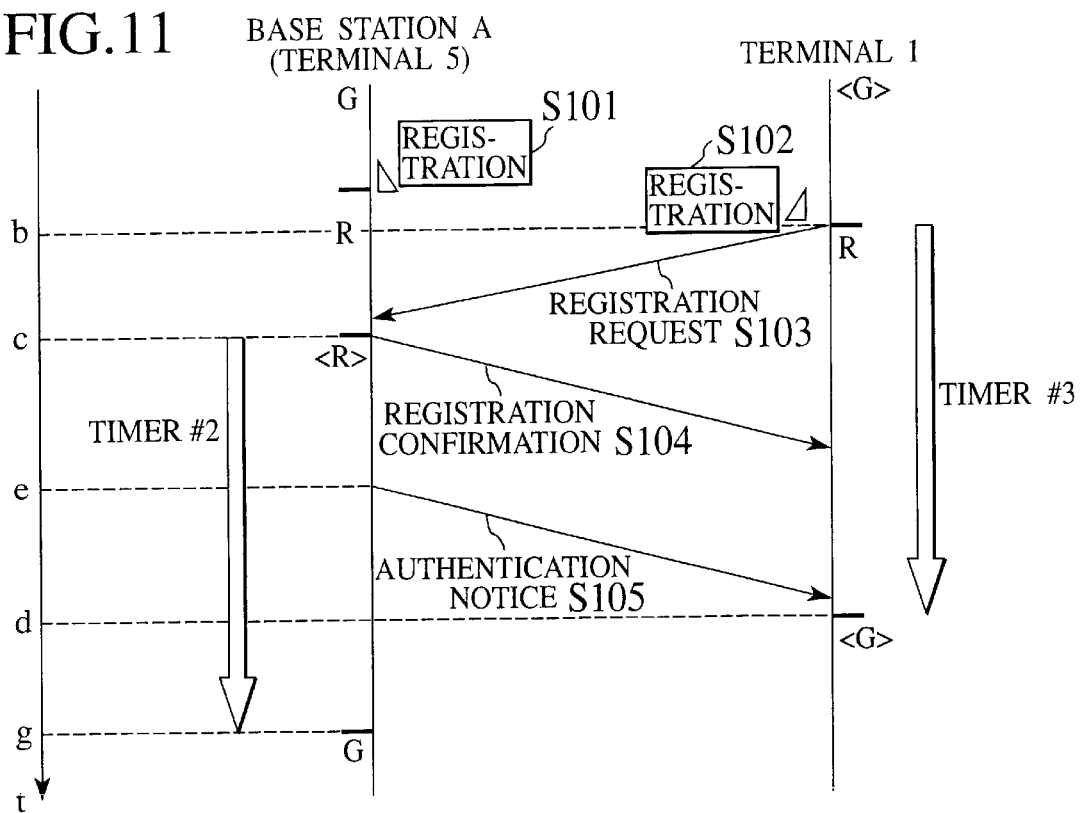
FIG. 11 is a sequence chart for explaining another exemplary timer operation in the registration and authentication sequence #1 of FIG. 2.

(2) FIG. 11 shows the sequence in the case where the terminal 1 could not correctly decrypt the registration confirmation information from the base station A. In this case, the terminal 1 cannot correctly receive the registration confirmation information so that the timer #3 becomes time-out and the mode of the terminal 1 is switched back to the normal mode. As a result, the base station A cannot receive the authentication acknowledgement information from the terminal 1 so that the timer #2 becomes time-out similarly and the mode of the base station A is also switched back to the normal mode.

Note that the timer #1 of the base station A is normally released at the time "c" at which the registration confirmation information is transmitted to the terminal 1.

Figure 12:
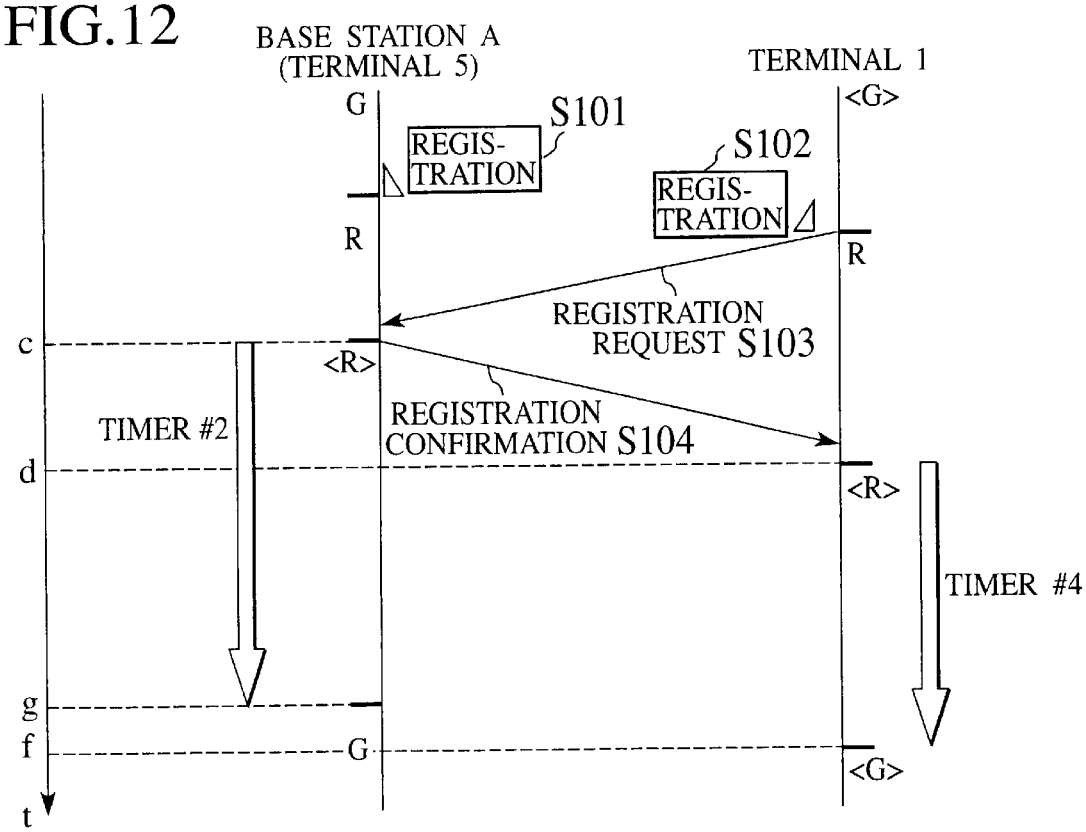
FIG. 12 is a sequence chart for explaining another exemplary timer operation in the registration and authentication sequence #1 of FIG. 2.

(3) FIG. 12 shows the sequence in the case where the terminal 1 could not correctly receive the authentication notice information from the base station A. As shown in FIG. 2 described above, normally the base station A is supposed to transmit the authentication notice information to the terminal 1 after a prescribed period of time has elapsed since the time "c" at which the timer #2 is started. However, there is a possibility for the base station A to fail to transmit this authentication notice information for some reason. In this case, the base station A cannot receive the authentication acknowledgement information from the terminal 1 as a result of the failure to receive the authentication notice information at the terminal 1. For this reason, the timer #2 becomes time-out and the mode of the base station A is switched back to the normal mode. On the other hand, the terminal 1 cannot receive the authentication notice information from the base station A so that the timer #4 becomes time-out and the mode of the terminal 1 is switched back to the normal mode.

Note that the timer #1 of the base station A is normally released at the time "c" at which the registration confirmation information is transmitted to the terminal 1. Also, the timer #3 of the terminal 1 is normally released at the time "d" at which the registration confirmation information is correctly decrypted.

Figure 13:
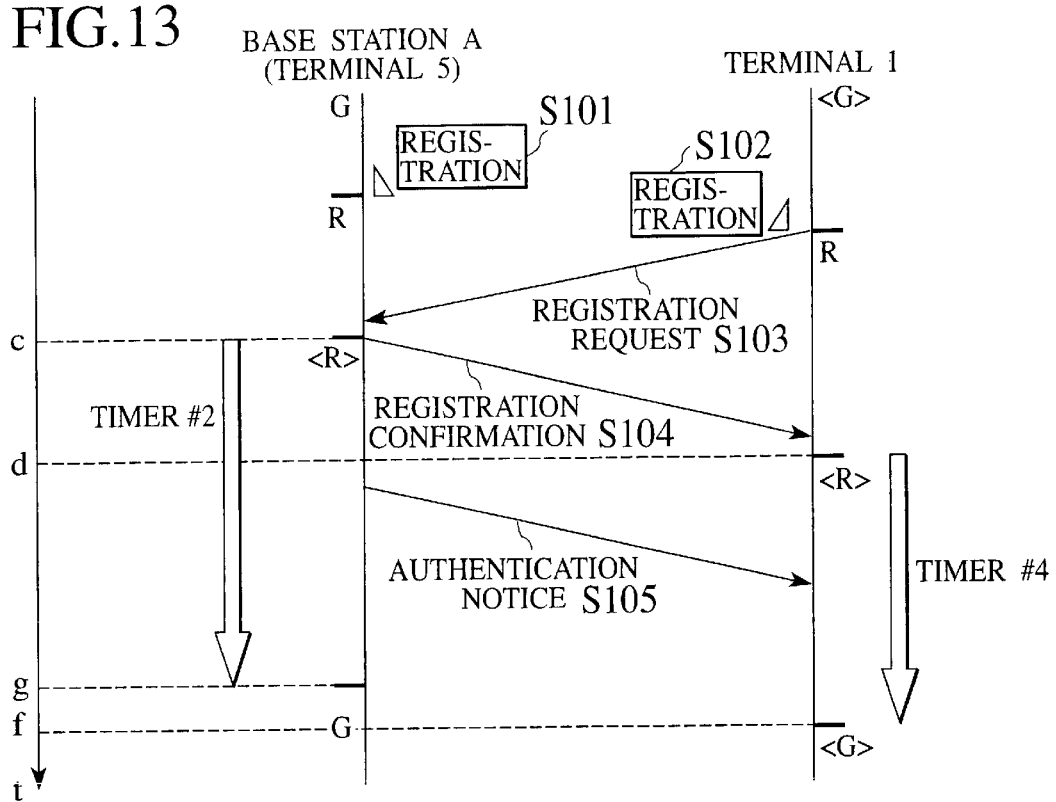
FIG. 13 is a sequence chart for explaining another exemplary timer operation in the registration and authentication sequence #1 of FIG. 2.

(4) FIG. 13 shows the sequence in the case where the terminal 1 could not correctly decrypt the authentication notice information from the base station A. In this case, the terminal 1 cannot correctly receive the authentication notice information from the base station A similarly as in the above case (3). For this reason, the timer #4 becomes time-out and the mode of the terminal 1 is switched back to the normal mode. On the other hand, the base station A cannot receive the authentication acknowledgement information from the terminal 1 similarly as in the above case (3) so that the timer #2 becomes time-out and the mode of the base station A is switched back to the normal mode. normally released at the time "c" at which the registration confirmation information is transmitted to the terminal 1. Also, the timer #3 of the terminal 1 is normally released at the time "d" at which the registration confirmation information is correctly decrypted.

Figure 14:
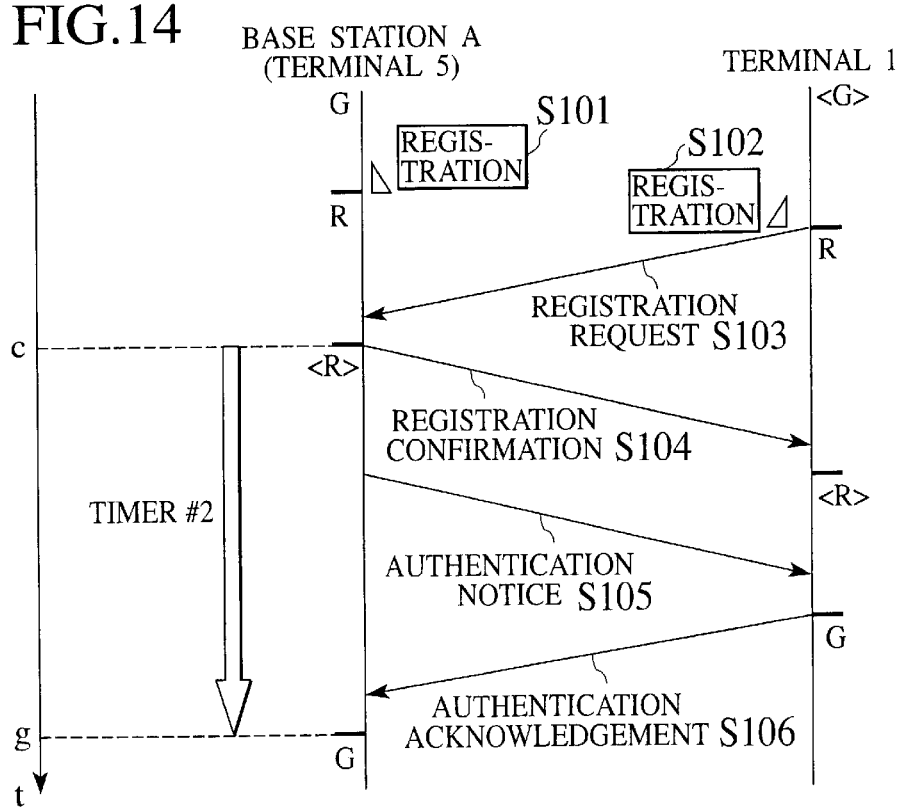
FIG. 14 is a sequence chart for explaining another exemplary timer operation in the registration and authentication sequence #1 of FIG. 2.

(5) FIG. 14 shows the sequence in the case where the base station A could not correctly decrypt the authentication acknowledgement information from the terminal 1. In this case, the base station A cannot decrypt the authentication acknowledgement information from the mode of the base station A is switched back to the normal mode. On the other hand, the terminal 1 correctly receives the authentication notice information from the base station A, so that the mode of the terminal 1 is switched back to the normal mode as a normal operation. Also, the failure of the decryption of the authentication acknowledgement information by the base station A will be detected by the time-out of the timer #2. When the limit time of this timer #2 is set longer than the time of the normal finish, the failure of the decryption of the authentication acknowledge information can be judged by the increase of time for which the base station A remains in the authentication mode.

Note that the timer #1 of the base station A is normally released at the time "c" at which the registration confirmation information is transmitted to the terminal 1. Also, the timer #3 of the terminal 1 is normally released at the time "d" at which the registration confirmation information is correctly decrypted. Also, the timer #4 of the terminal 1 is normally released at the time "f" at which the authentication acknowledgement information is transmitted to the base station A.

In the cases (1) to (4) described above, if the normal mode of the terminal 1 has the non-registered normal mode and the registered normal mode, the mode of the terminal 1 is switched back to the non-registered normal mode when the registration and authentication fails. In this case, the user can judge the failure more visually than in the case of using one type of normal mode.

In the first embodiment described above, the registration and authentication of only one terminal can be carried out by one registration and authentication sequence. In the following, this point will be described with reference to FIG. 15. In the example shown in FIG. 15, the registration button is pressed earlier at the terminal 2 than at the terminal 1 (steps S102, S102'), so that the registration request information of the terminal 2 is received (steps S103, S103') and the registration and authentication of the terminal 2 is carried out. On the other hand, the terminal 1 was in the registration mode since the time "ts" at which the registration button is pressed, but the timer #1 becomes time-out at the time "te" so that the mode of the terminal 1 is switched back to the normal mode. The failure of the registration and authentication of the terminal 1 can be judged from the time-out of the timer #1 and the fact that the terminal 1 was not switched to the authentication mode.

As such, when the base station receives the registration request information only while it is in the registration mode and only from one terminal, it is possible to guarantee that the registration and authentication is carried out for only one terminal at one time. In this way, the erroneous registration and authentication of the terminal of the other home or outside the home can be guessed so that the registration and authentication of the terminal can be retried.

Figure 15:
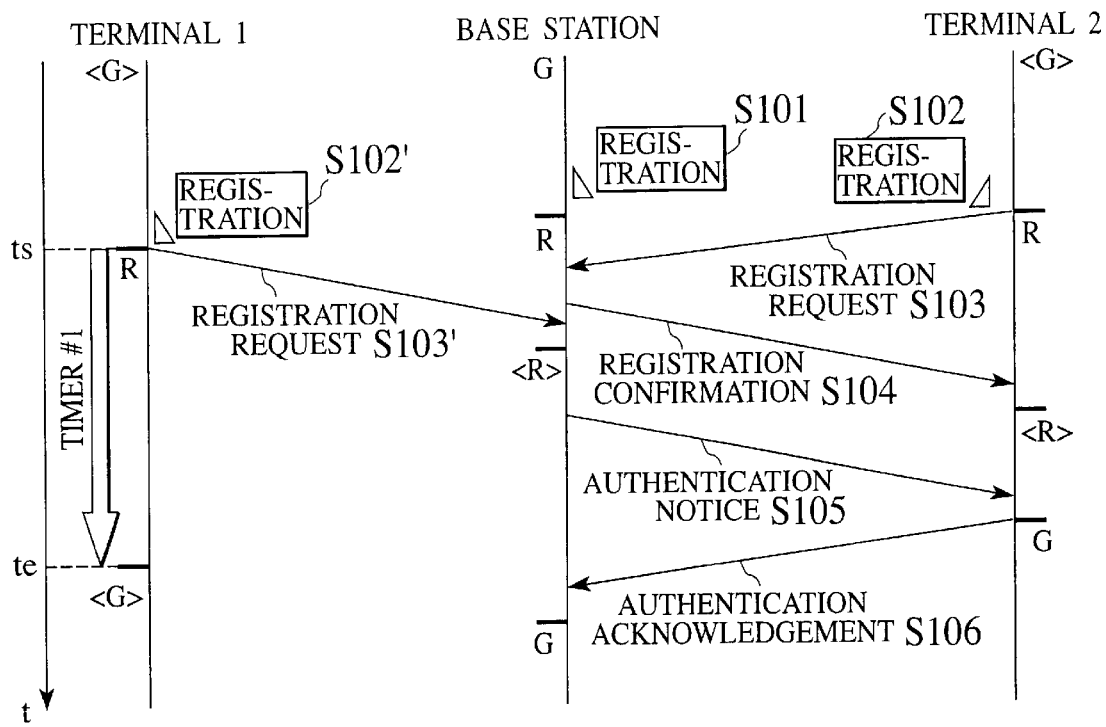
FIG. 15 is a sequence chart for explaining one exemplary operation according to the registration and authentication sequence #1 of FIG. 2.

For example, suppose that the terminal 1 is an internal terminal and the terminal 2 is an external terminal in FIG. 15. In this case, it is apparent that the base station A is following the correct sequence despite of the fact that the internal terminal 1 encountered the failure, so that it is possible to judge that there is a possibility for the erroneous registration and authentication of some other terminal (the external terminal 2 in this case). By being able to make the judgement in this way, it is possible to retry the registration and authentication of the internal terminal 1 or correct the registration and authentication table of the base station shown in FIG. 9. In the correction of the registration and authentication table of the base station, the deletion of only the latest information or the deletion of all the informations can be carried out.

Also, in the first embodiment described above, it is possible to use the sequence in which the transmission of the registration confirmation information (step S104) and the transmission of the authentication notice information (step S105) in FIG. 2 is unified. In this case, when the registration request information from the terminal 1 is received, the base station A combines the registration confirmation information of FIG. 5 and the authentication notice information of FIG. 6, encrypts it by using the public key and the encryption algorithm for the public key cryptosystem of the terminal 1, and transmits it to the terminal 1. When this registration confirmation and authentication notice information is received, the mode of the terminal 1 is switched to the authentication mode. The authentication acknowledgement information is produced while the terminal 1 is in this authentication mode. Then, when the authentication acknowledgement information is transmitted to the base station A, the mode of the terminal 1 is switched to the normal mode.

As described, according to the first embodiment, there is a need to operate the registration button on the terminal 1 after operating the registration button on the base station A and before the timer #1 of the base station A becomes time-out. For this reason, it is possible to realize the secure and easy registration and authentication processing even when the wireless communications are used, in conjunction with the fact that it is difficult to operate the base station A provided inside the home from the external.

Second Embodiment

Next, with references to FIG. 16 and FIG. 17, the second embodiment of the wireless communication system according to the present invention will be described.

Figure 16:
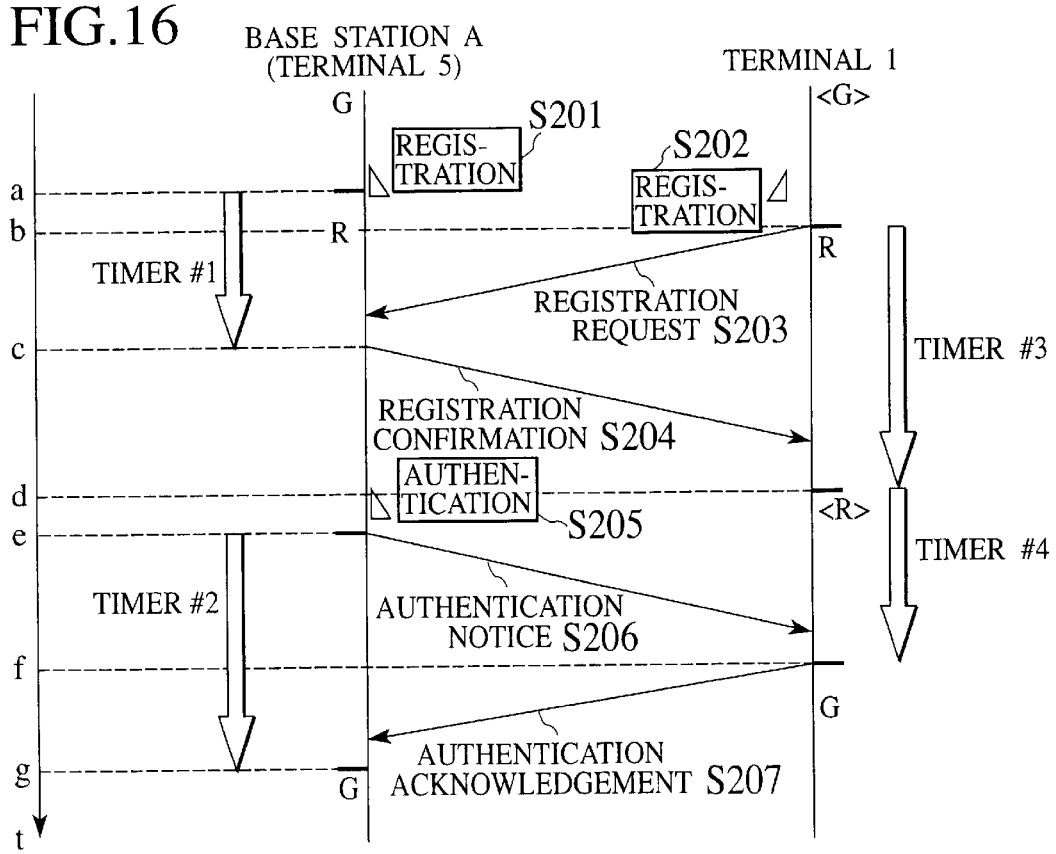
FIG. 16 is a sequence chart for a registration and authentication sequence #2 according to the second embodiment of the present invention.

FIG. 16 shows a registration and authentication sequence (a registration and authentication sequence #2) for the wireless communication system of the second embodiment. The registration and authentication sequence #2 of FIG. 16 differs from the registration and authentication sequence #1 of the first embodiment described above in that an authentication button is to be pressed explicitly (step S205) when the base station A transmits the authentication notice information at the time "e" (step S206).

This authentication button may be provided separately from the registration button or the same button may be used. In the case of using the same button, it may be made such that it functions as the registration button when it is pressed briefly (for within one second, for example) and it functions as the authentication button when it is pressed longer (for several seconds, for example). There are many other possible variations. In any case, by utilizing the authentication button in this way, it is possible to start the authentication operation explicitly by using the authentication button after the user confirmed that the mode of the terminal is switched from the registration mode to the authentication mode. Consequently, it becomes possible for the user to easily recognize the fact that the registration stage is finished and the processing entered the authentication stage, compared with the registration and authentication sequence #1 of the first embodiment described above.

The timers (timer #1, timer #2, timer #3, timer #4) of FIG. 16 are similar to those of the registration and authentication sequence #1 of FIG. 2, except that the timer #2 is started differently. Also, the ways of using these timers are the same as the registration and authentication sequence #1 and the timers are operated similarly as in FIG. 10 to FIG. 14. The timer #2 of the base station A of FIG. 16 is started when the user presses the authentication button on the base station A. The timer #2 is released when the authentication acknowledgement information is correctly decrypted, or when the limit time is reached in the other abnormal cases.

Figure 17:
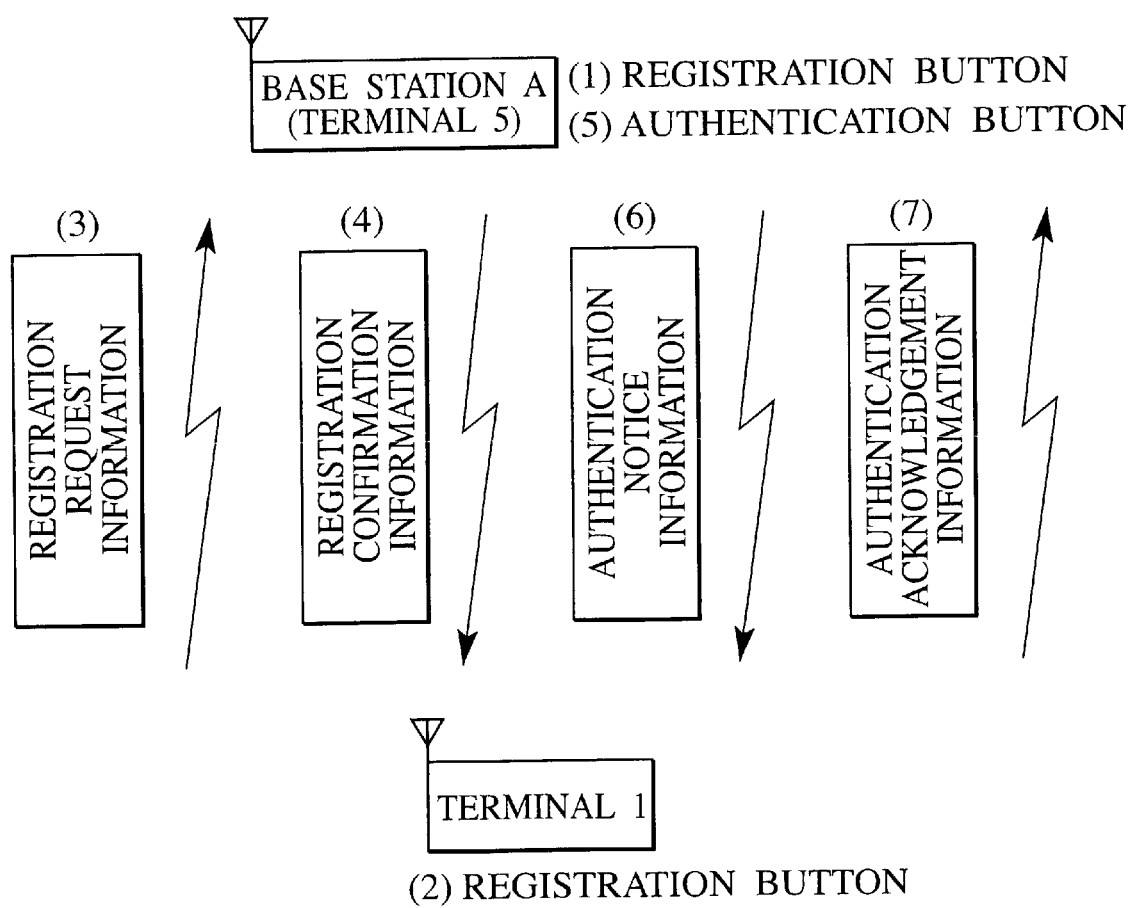
FIG. 17 is a diagram showing information to be exchanged between a base station and a terminal according to the registration and authentication sequence #2 shown in FIG. 16.

FIG. 17 explains the registration and authentication sequence #2 of FIG. 16 by focusing attention on information to be exchanged between the base station A and the terminal 1. In FIG. 17, numerals in brackets indicate the sequential order in the registration and authentication sequence #2. In this registration and authentication sequence #2, a registration request information and an authentication acknowledgement information are transmitted from the terminal 1 to the base station A by the wireless communications. Also, a registration confirmation information and an authentication notice information are transmitted from the base station A to the terminal 1 by the wireless communications.

This second embodiment has an advantage compared with the first embodiment described above in that the erroneous registration and authentication of the undesired terminal can be prevented because the correlation between the authentication notice and the switching of the mode of the terminal into the authentication mode is clearer. In the examples of FIG. 11, FIG. 13 and FIG. 14 described above for the first embodiment, there is a possibility that the failure of the registration and authentication of the terminal 1 is caused by the erroneous registration and authentication of another terminal. This is because the terminal 1 cannot know the timing at which the authentication notice is returned from the base station A. In contrast, in this second embodiment, the user operates the authentication button on the base station A after confirming that the mode of the terminal 1 is switched to the authentication mode, so that this return timing is clear. Consequently, it is possible to prevent the base station A from carrying out the erroneous registration and authentication of another terminal.

As described, according to the second embodiment, there is a need to operate the registration button on the terminal 1 after operating the registration button on the base station A and before the timer #1 of the base station A becomes time-out, and there is also a need to operate the authentication button on the base station A after the mode of the terminal 1 is switched to the authentication mode. For this reason, it is possible to realize the secure and easy registration and authentication processing even when the wireless communications are used, in conjunction with the fact that it is difficult to operate the base station A provided inside the home from the external.

Third Embodiment

Next, with references to FIG. 18 and FIG. 19, the third embodiment of the wireless communication system according to the present invention will be described.

Figure 18:
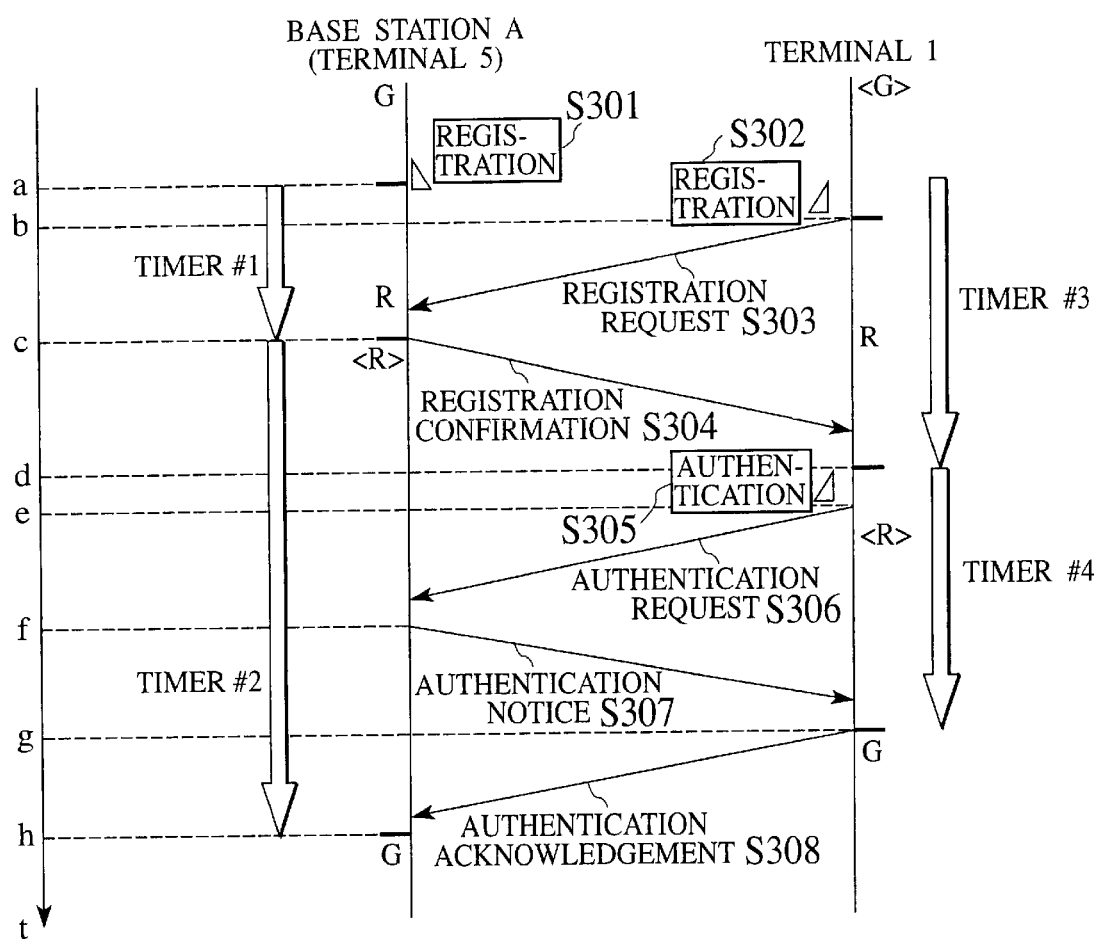
FIG. 18 is a sequence chart for a registration and authentication sequence #3 according to the third embodiment of the present invention.

FIG. 18 shows a registration and authentication sequence (a registration and authentication sequence #3) for the wireless communication system of the third embodiment. The registration and authentication sequence #3 of FIG. 18 differs from the registration and authentication sequence #2 of the second embodiment described above in that the user explicitly presses an authentication button on the terminal 1 (step S305) rather than the authentication button on the base station A. In this way, the user requests the authentication by using the authentication button on the terminal 1 side after confirming that the mode of the terminal 1 is switched from the registration mode to the authentication mode (step S306), and then, after the authentication notice (step S307), the authentication acknowledgement is made (step S308). Unlike the registration and authentication sequences #1 and #2 described above, the operation of the authentication button on the terminal 1 is carried out by the user (step S305) in this registration and authentication sequence #3.

Figure 20:
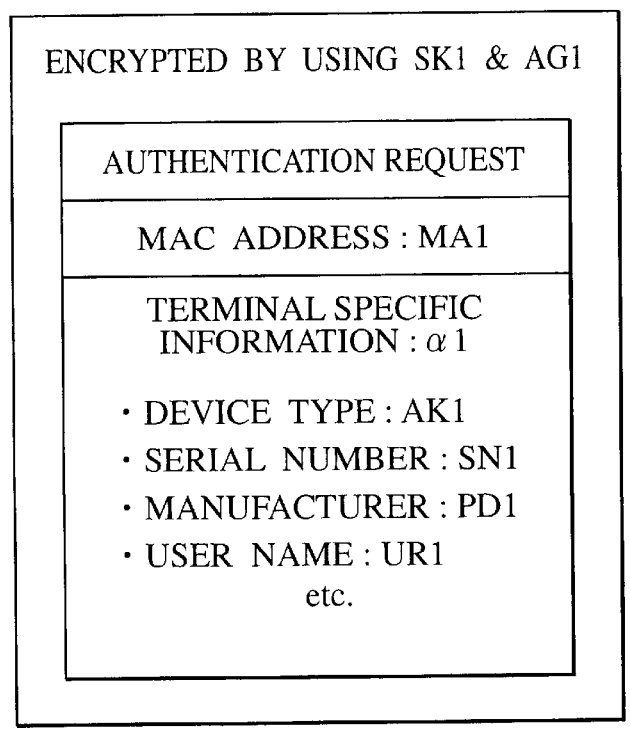
FIG. 20 is a diagram showing an exemplary content of an authentication request information used in the registration and authentication sequence #3 of FIG. 18.

The authentication request information of the step S306 contains an authentication request, the MAC address of the terminal 1, and the terminal specific information, as shown in FIG. 20. These data are encrypted by using the secret key of the public key cryptosystem of the terminal 1 and transmitted from the terminal 1 to the base station A. Note here that the secret key of the terminal 1 is used. Consequently, these data cannot be decrypted unless the public key corresponding to this secret key is used. This is effectively a digital signature by the terminal 1. By this digital signature, it is possible to judge whether the received authentication request information is the authentication request information transmitted by the terminal 1 for which the registration is completed by the time "d".

Figure 19:
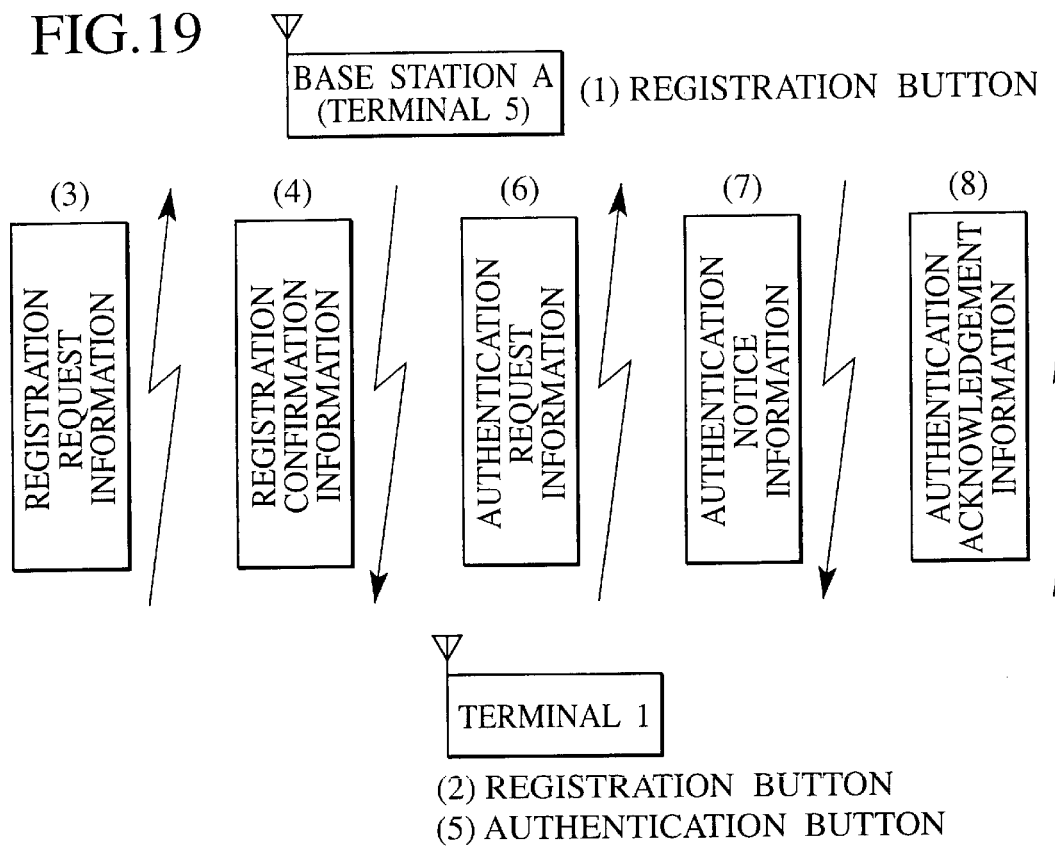
FIG. 19 is a diagram showing information to be exchanged between a base station and a terminal according to the registration and authentication sequence #3 shown in FIG. 18.

FIG. 19 explains the registration and authentication sequence #3 of FIG. 18 by focusing attention on information to be exchanged between the base station A and the terminal 1. In FIG. 19, numerals in brackets indicate the sequential order in the registration and authentication sequence #3. In this registration and authentication sequence #3, a registration request information, an authentication request information, and an authentication acknowledgement information are transmitted from the terminal 1 to the base station A by the wireless communications. Also, a registration confirmation information and an authentication notice information are transmitted from the base station A to the terminal 1 by the wireless communications.

In this third embodiment, similarly as in the second embodiment described above, the erroneous registration and authentication of the undesired terminal can be prevented because the correlation between the authentication notice and the switching of the mode of the terminal into the authentication mode is clearer.

As described, according to the third embodiment, there is a need to operate the registration button on the terminal 1 after operating the registration button on the base station A and before the timer #1 of the base station A becomes time-out, and there is also a need to operate the authentication button on the terminal 1 after the mode of the terminal 1 is switched to the authentication mode and before the timer #2 of the base station A becomes time-out. For this reason, it is possible to realize the secure and easy registration and authentication processing even when the wireless communications are used, in conjunction with the fact that it is difficult to operate the base station A provided inside the home from the external.

Fourth Embodiment

Next, with references to FIG. 21 and FIG. 22, the fourth embodiment of the wireless communication system according to the present invention will be described.

Figure 21:
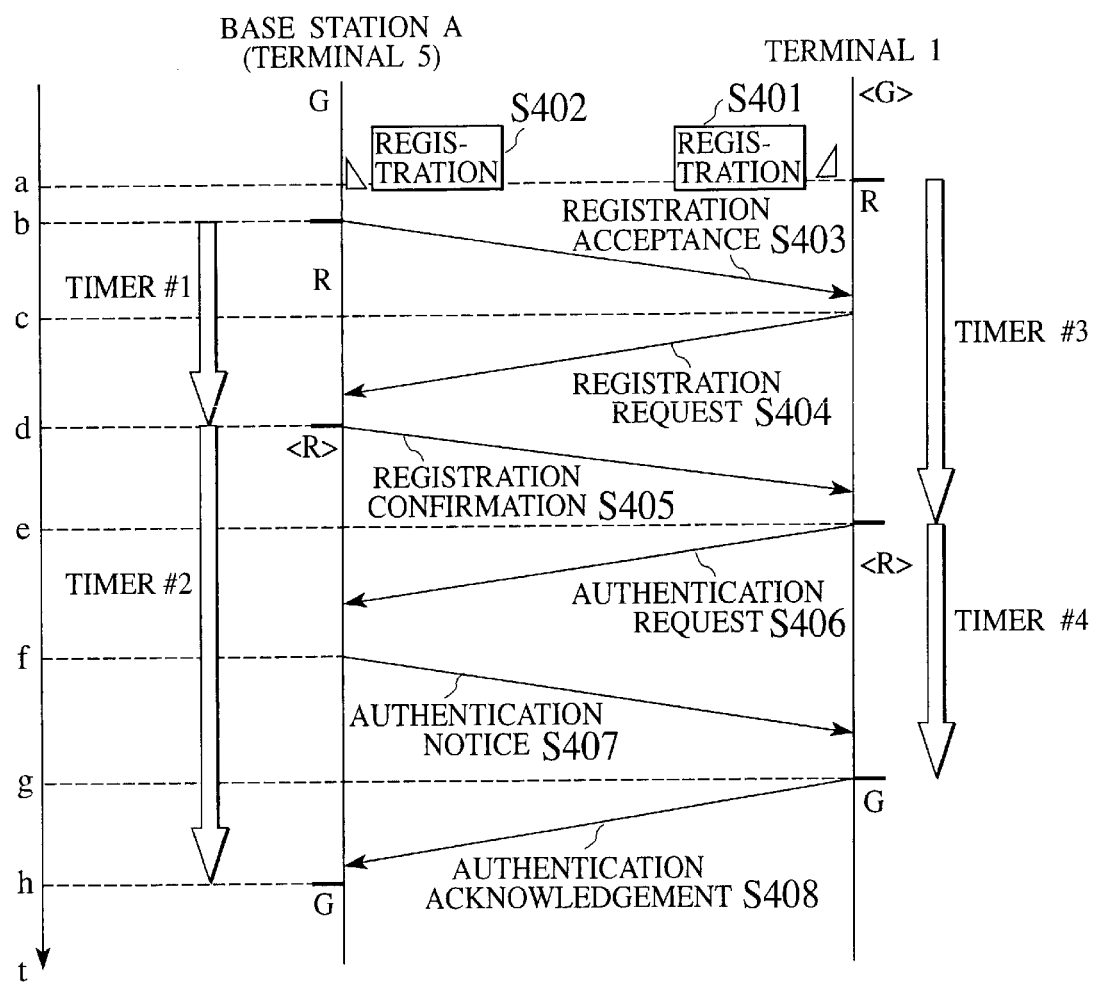
FIG. 21 is a sequence chart for a registration and authentication sequence #4 according to the fourth embodiment of the present invention.
Figure 22:
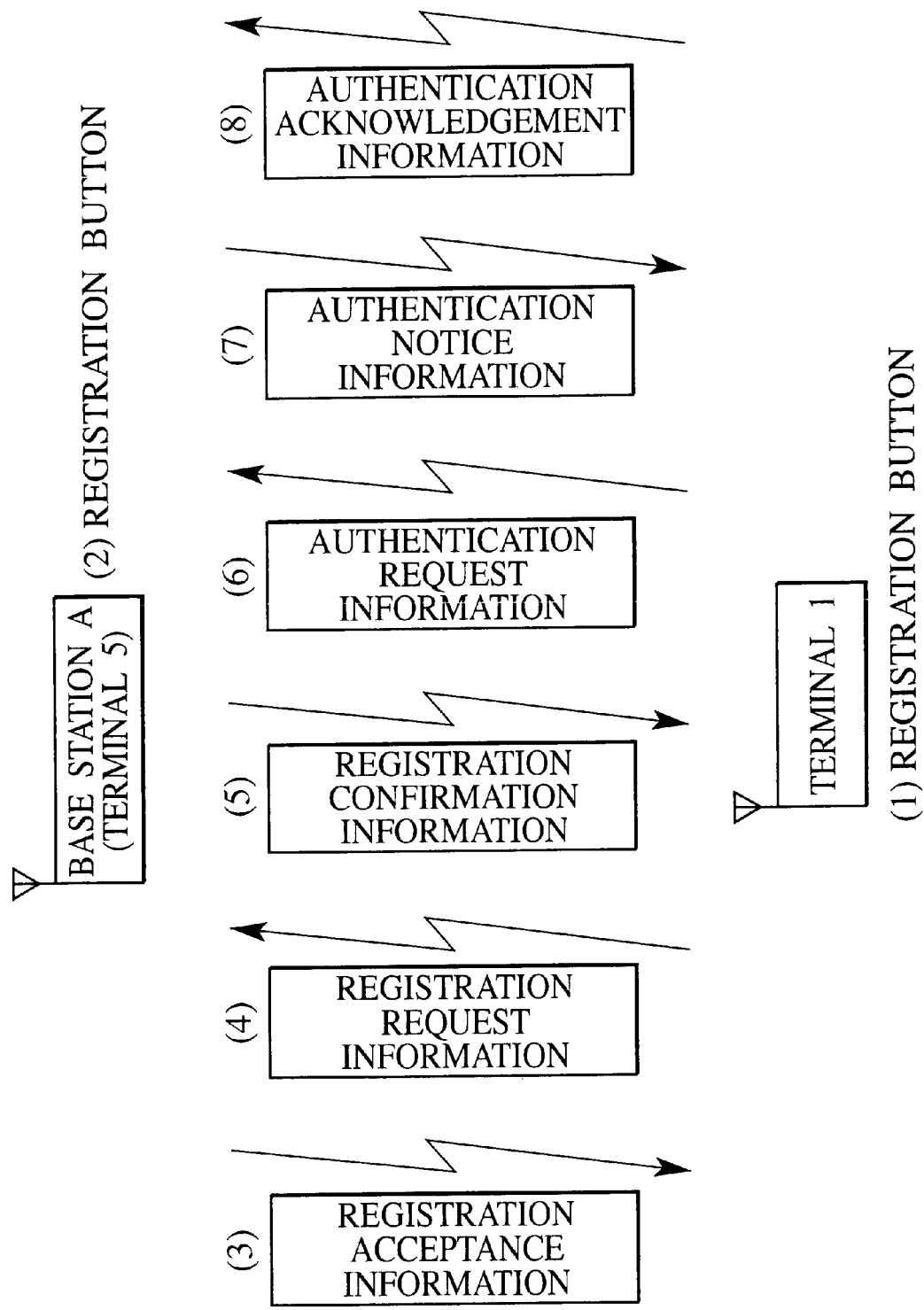
FIG. 22 is a diagram showing information to be exchanged between a base station and a terminal according to the registration and authentication sequence #4 shown in FIG. 21.

FIG. 21 shows a registration and authentication sequence (a registration and authentication sequence #4) for the wireless communication system of the fourth embodiment. FIG. 22 explains the registration and authentication sequence #4 of FIG. 21 by focusing attention on information to be exchanged between the base station A and the terminal 1. In FIG. 22, numerals in brackets indicate the sequential order in the registration and authentication sequence #4. In this registration and authentication sequence #4, a registration request information, an authentication request information, and an authentication acknowledgement information are transmitted from the terminal 1 to the base station A by the wireless communications. Also, a registration acceptance information, a registration confirmation information and an authentication notice information are transmitted from the base station A to the terminal 1 by the wireless communications. In the following, this registration and authentication sequence #4 will be described with reference to FIG. 21.

(a) First, the user presses the registration button on the terminal 1 (time "a", step S401). In other words, the mode of the terminal 1 is switched to the registration mode (indicated by the LED display with a red light on) first. At this point, the timer #3 is started.

Figure 23:
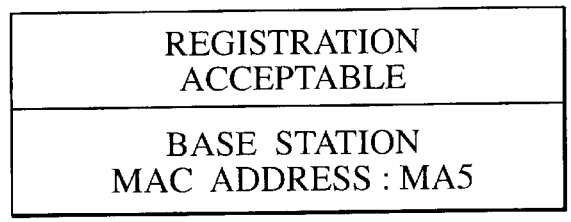
FIG. 23 is a diagram showing an exemplary content of a registration acceptance information used in the registration and authentication sequence #4 of FIG. 21.

(b) Next, the user presses the registration button on the base station A (time "b", step S402). When the registration button is pressed, the base station A transmits the registration acceptance information shown in FIG. 23 to the terminal 1 (step S403). At this point, the mode of the base station A is switched to the registration mode (indicated by the LED display with a red light on). Also, at the same time, the timer #1 is started. As shown in FIG. 23, the registration acceptance information contains a flag indicating that the registration acceptance and the MAC address of the base station A.

(c) Upon receiving the registration acceptance information from the base station A, the terminal 1 transmits the registration request information shown in FIG. 4 described above to the base station A (step S404).

(d) Upon receiving the registration request information from the terminal 1, the base station A transmits the registration confirmation information shown in FIG. 5 described above to the terminal 1 (step S405). At this point, the mode of the base station A is switched from the registration mode to the authentication mode. Also, the timer #1 is normally finished and the timer #2 is started. The registration confirmation information transmitted from the base station A is encrypted by using the public key of the terminal 1 obtained from the registration request so that only the terminal 1 can read its contents, similarly as in the first embodiment described above.

(e) When the registration confirmation information from the base station A is correctly decrypted, the terminal 1 transmits the authentication request information shown in FIG. 20 described above to the base station A (step S406). At this point, the mode of the terminal 1 is switched from the registration mode to the authentication mode. Also the timer #3 is normally finished and the timer #4 is started. The authentication request information of FIG. 20 is encrypted by using the secret key of the terminal 1 so that it cannot be decrypted unless the public key corresponding to this secret key is used. This is effectively a digital signature by the terminal 1. By this digital signature, it is possible to judge whether the received authentication request information is the authentication request information transmitted by the terminal 1 for which the registration is completed by the above (a) to (d).

(f) The base station A knows the public key of the terminal 1 so that the base station A can decrypt the authentication request information from the terminal 1. Then, the base station A transmits the authentication notice information shown in FIG. 6 described above to the terminal 1 (step S407). This authentication notice information is encrypted by using the public key of the terminal 1 and to be decrypted by using the secret key corresponding to this public key at the terminal 1.

(g) When the secret key of the base station A is correctly extracted by this decryption, the terminal 1 transmits the authentication acknowledgement information shown in FIG. 7 described above to the base station A (step S408). At this point, the mode of the terminal 1 is switched to the (registered) normal mode, and the timer #4 is normally finished.

(h) Upon receiving the authentication acknowledgement information from the terminal 1, the mode of the base station A is switched to the normal mode, and the timer #2 is normally finished. This completes the registration and authentication of the terminal 1.

As described, this fourth embodiment is characterized in that the base station A has an initiative throughout the entire processing, unlike the first to third embodiments described above. According to the fourth embodiment, there is a need to operate the registration button on the base station A after operating the registration button on the terminal 1 and before the timer #3 of the terminal 1 becomes time-out. For this reason, it is possible to realize the secure and easy registration and authentication processing even when the wireless communications are used, in conjunction with the fact that it is difficult to operate the base station A provided inside the home from the external.

Fifth Embodiment

Next, with references to FIG. 24 and FIG. 25, the fifth embodiment of the wireless communication system according to the present invention will be described.

Figure 24:
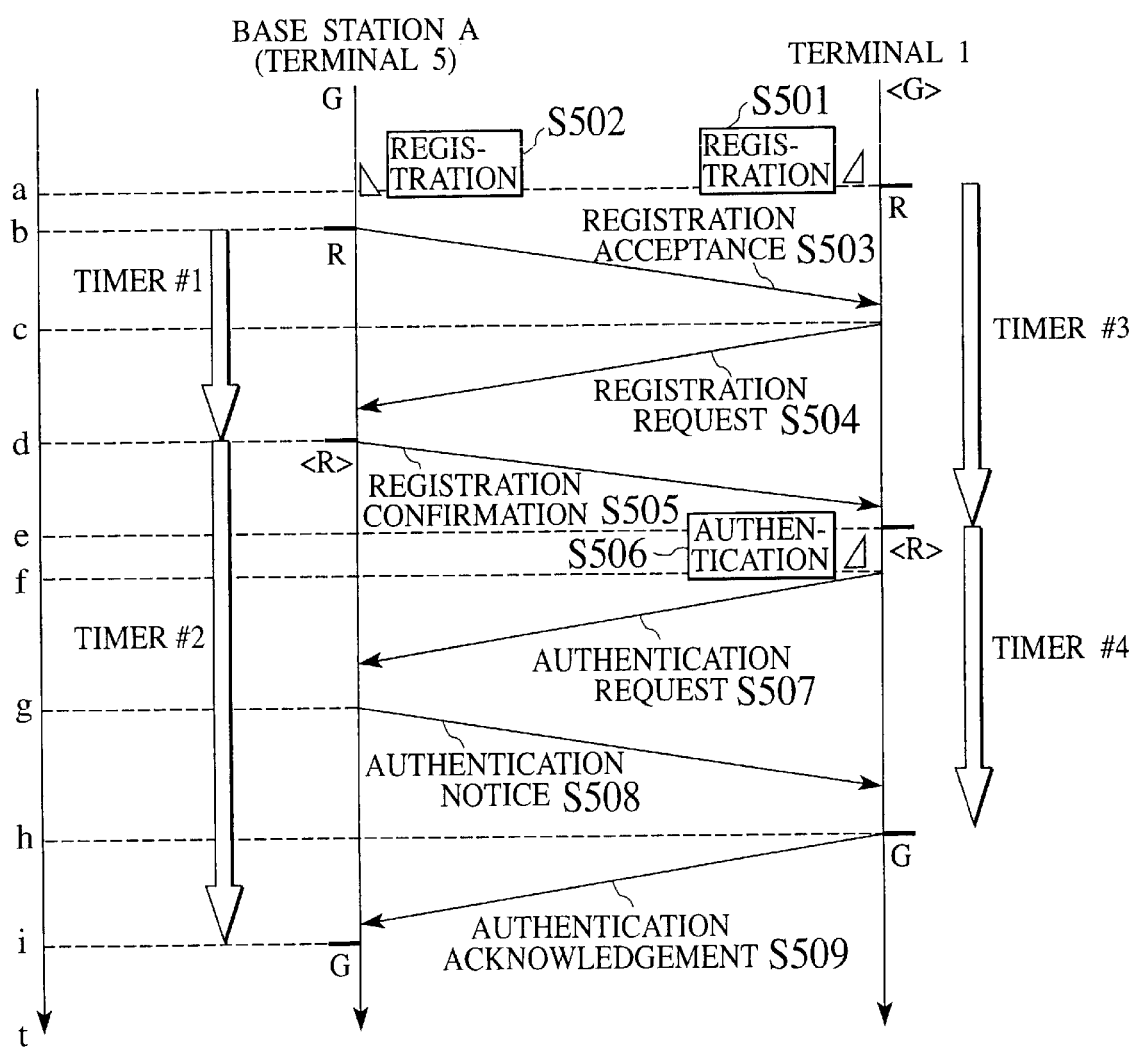
FIG. 24 is a sequence chart for a registration and authentication sequence #5 according to the fifth embodiment of the present invention.

FIG. 24 shows a registration and authentication sequence (a registration and authentication sequence #5) for the wireless communication system of the fifth embodiment. The registration and authentication sequence #5 of FIG. 24 differs from the registration and authentication sequence #4 of the fourth embodiment described above in that an authentication button is to be utilized when the terminal 1 transmits the authentication request information at the time "f". In this way, the user can request the authentication by using the authentication button after confirming that the mode of the terminal 1 is switched from the registration mode to the authentication mode. There is an extra task of operating the authentication button compared with the registration and authentication sequence #4 described above, but there is an effect of making the user more conscious of the authentication processing.

Figure 25:
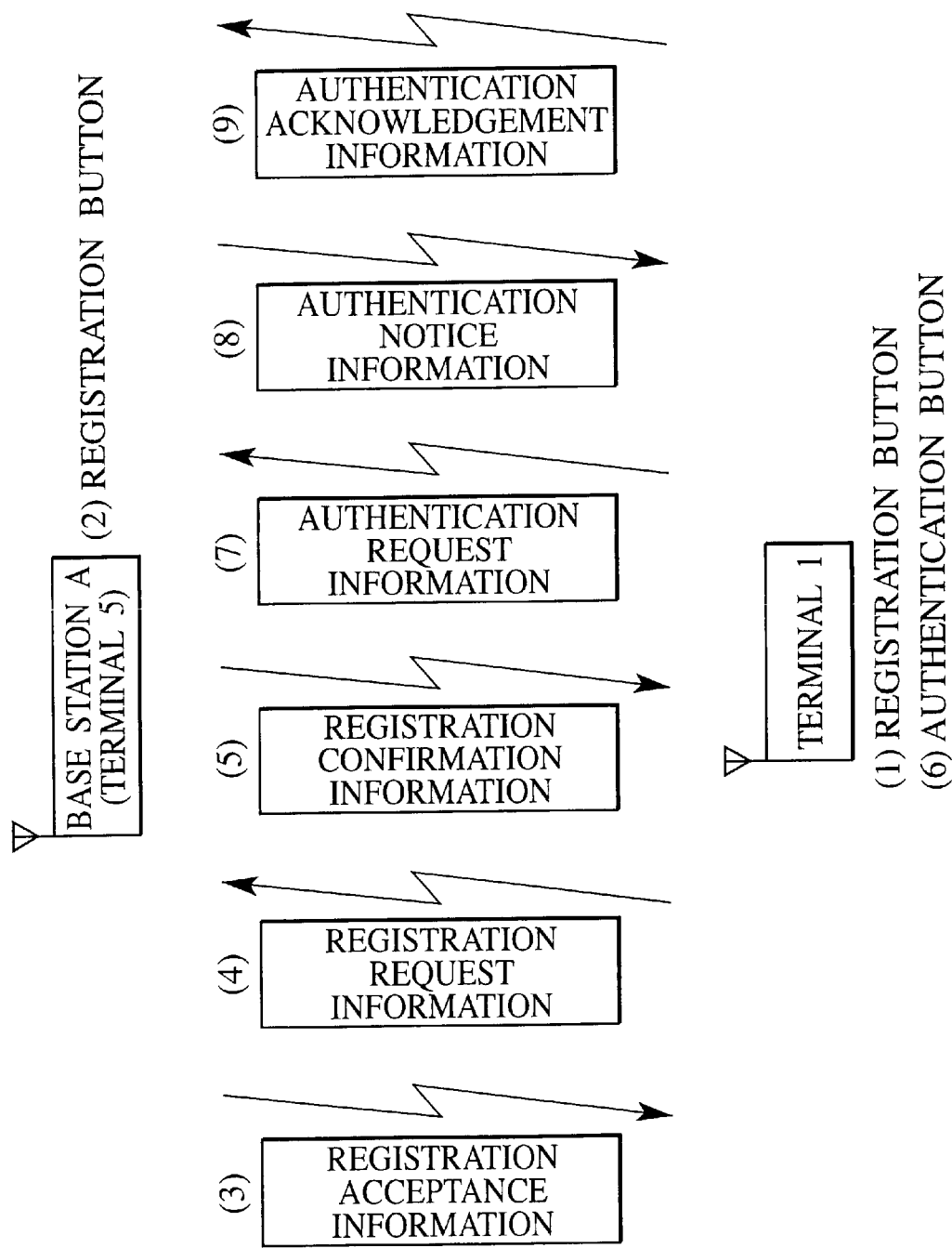
FIG. 25 is a diagram showing information to be exchanged between a base station and a terminal according to the registration and authentication sequence #5 shown in FIG. 24.

FIG. 25 explains the registration and authentication sequence #5 of FIG. 24 by focusing attention on information to be exchanged between the base station A and the terminal 1. In FIG. 25, numerals in brackets indicate the sequential order in the registration and authentication sequence #5. In this registration and authentication sequence #5, a registration request information, an authentication request information, and an authentication acknowledgement information are transmitted from the terminal 1 to the base station A by the wireless communications. Also, a registration acceptance information, a registration confirmation information and an authentication notice information are transmitted from the base station A to the terminal 1 by the wireless communications. In the following, this registration and authentication sequence #5 will be described with reference to FIG. 24.

As described, according to the fifth embodiment, there is a need to operate the registration button on the base station A after operating the registration button on the terminal 1 and before the timer #3 of the terminal 1 becomes time-out, and there is also a need to operate the authentication button on the terminal 1 after the mode of the terminal 1 is switched to the authentication mode and before the timer #2 of the base station A becomes time-out. For this reason, it is possible to realize the secure and easy registration and authentication processing even when the wireless communications are used, in conjunction with the fact that it is difficult to operate the base station A provided inside the home from the external.

Sixth Embodiment

Next, with references to FIG. 26 and FIG. 27, the sixth embodiment of the wireless communication system according to the present invention will be described.

Figure 26:
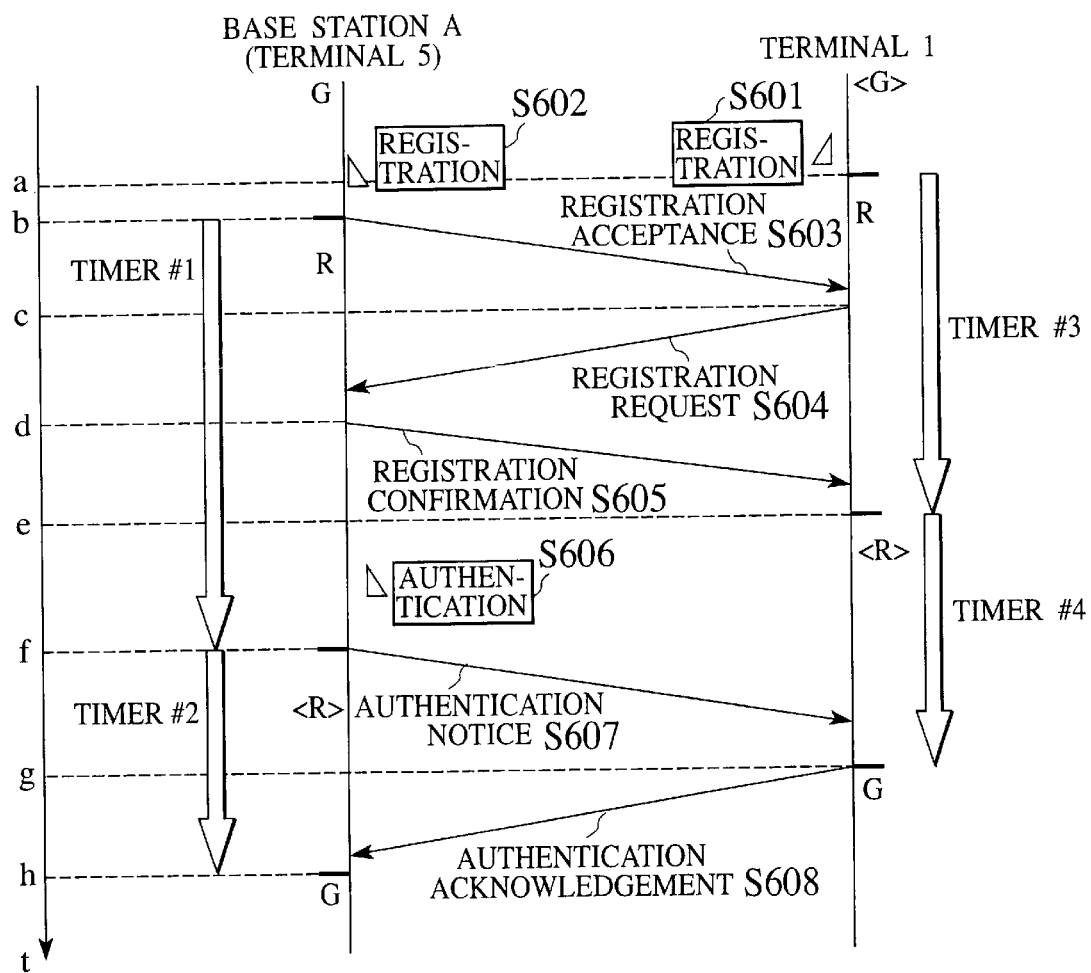
FIG. 26 is a sequence chart for a registration and authentication sequence #6 according to the sixth embodiment of the present invention.

FIG. 26 shows a registration and authentication sequence (a registration and authentication sequence #6) for the wireless communication system of the sixth embodiment. The registration and authentication sequence #6 of FIG. 26 differs from the registration and authentication sequence #5 of the fifth embodiment described above in that the authentication button is utilized on based station A at the time "f" rather than on the terminal 1. By this operation, the base station A transmits the authentication notice information shown in FIG. 6 described above to the terminal 1. Unlike the registration and authentication sequence #5, there is no need for the terminal 1 to transmit the authentication request information. In other words, the transmission of the authentication request information is replaced by the pressing of the authentication button on the base station A after confirming that the mode of the terminal 1 is switched from the registration mode to the authentication mode. Also, there is an extra task of operating the authentication button compared with the registration and authentication sequence #4 of the fourth embodiment, but there is an effect of making the user more conscious of the authentication processing.

Figure 27:
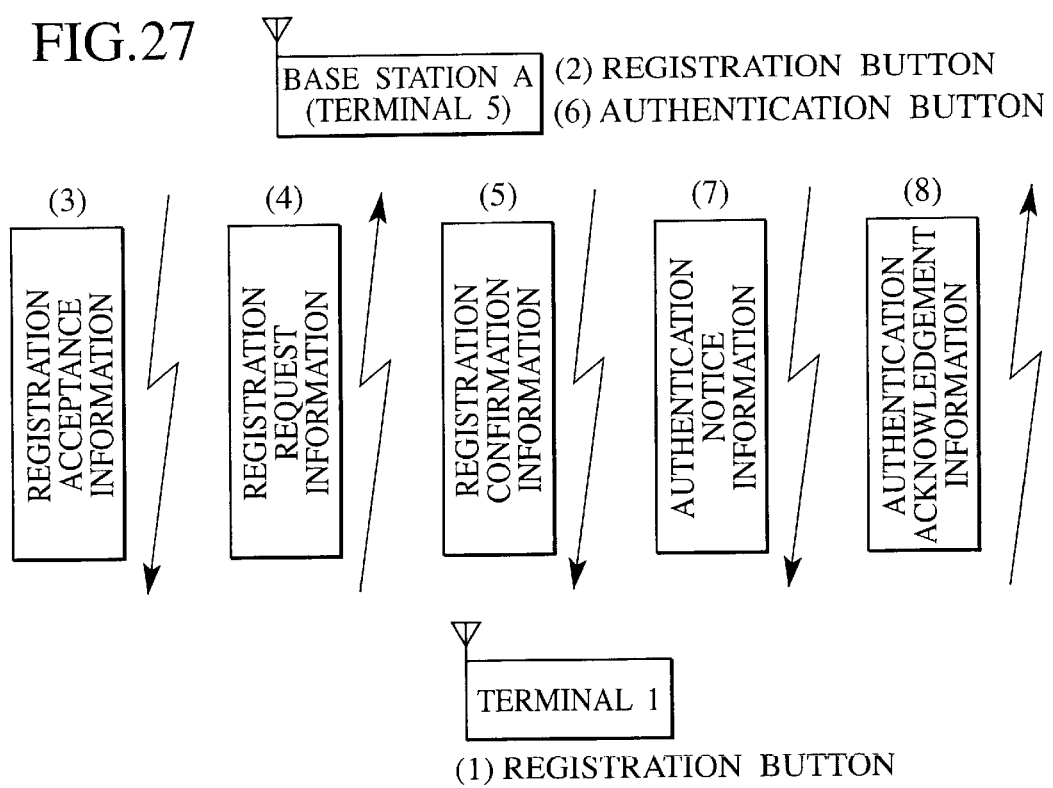
FIG. 27 is a diagram showing information to be exchanged between a base station and a terminal according to the registration and authentication sequence #6 shown in FIG. 26.

FIG. 27 explains the registration and authentication sequence #6 of FIG. 26 by focusing attention on information to be exchanged between the base station A and the terminal 1. In FIG. 26, numerals in brackets indicate the sequential order in the registration and authentication sequence #6. In this registration and authentication sequence #6, a registration request information and an authentication acknowledgement information are transmitted from the terminal 1 to the base station A by the wireless communications. Also, a registration acceptance information, a registration confirmation information and an authentication notice information are transmitted from the base station A to the terminal 1 by the wireless communications.

As described, according to the sixth embodiment, there is a need to operate the registration button on the base station A after operating the registration button on the terminal 1 and before the timer #3 of the terminal 1 becomes time-out, and there is also a need to operate the authentication button on the base station A after the mode of the terminal 1 is switched to the authentication mode and before the timer #4 of the terminal 1 becomes time-out. For this reason, it is possible to realize the secure and easy registration and authentication processing even when the wireless communications are used, in conjunction with the fact that it is difficult to operate the base station A provided inside the home from the external.

Wireless Base Station

Next, the wireless base station to be used in the wireless communication system according to the embodiments of the present invention will be described.

Figure 28:
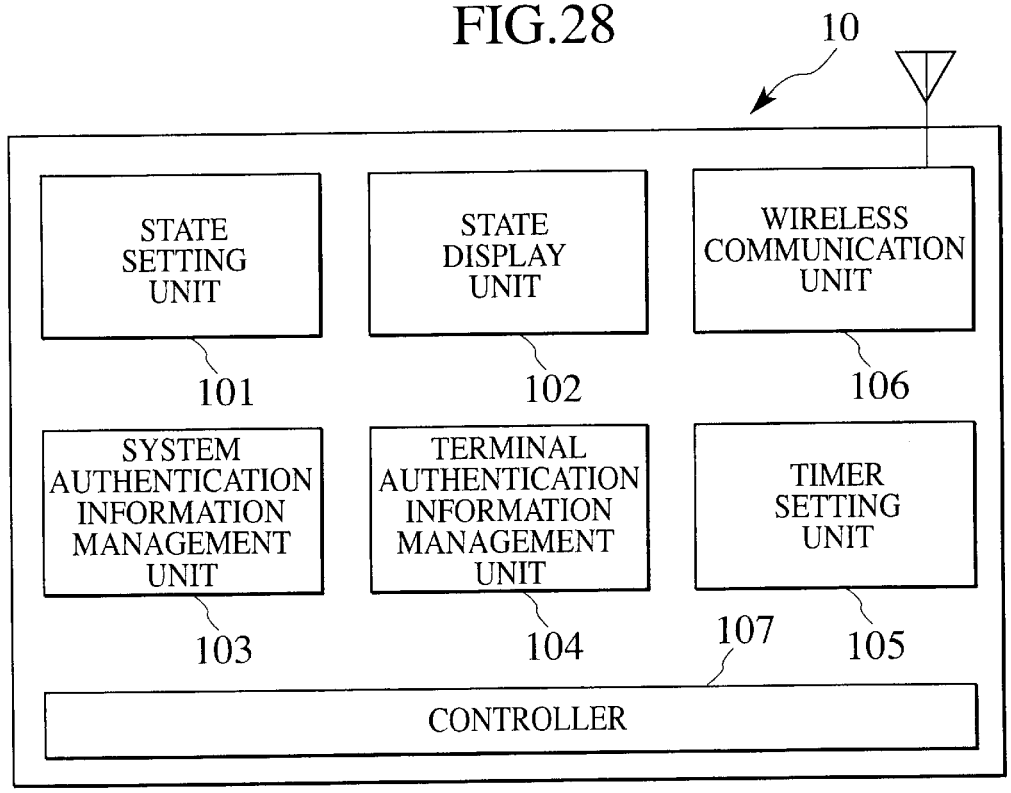
FIG. 28 is a block diagram showing an exemplary configuration of a wireless base station in the wireless communication system according to the present invention.

FIG. 28 shows a configuration of the wireless base station according to one embodiment of the present invention. As shown in FIG. 28, this base station 10 comprises a state setting unit 101, a state display unit 102, a system authentication information management unit 103, a terminal authentication information management unit 104, a timer setting unit 105, a wireless communication unit 106 and a controller 107.

The state setting unit 101 is in forms of buttons for the registration mode and the authentication mode.

The state display unit 102 is the LED display described in the first to sixth embodiments described above. Besides the LED display, it is also possible to use an instruction display on a display screen such as that of liquid crystal, an indication by character string printed next to the LED, an indication by sound, an indication by melody, an instruction display on a screen of another node connected through a network, etc.

The system authentication information management unit 103 manages the secret key cryptosystem used in a system under the control of this base station 10. The secret key and the encryption algorithm of the secret key cryptosystem are managed, and there is a need to make them not easily readable from the external.

The terminal authentication information management unit 104 manages the terminal specific information, the public key and the encryption algorithm of each terminal for which the registration and authentication has been carried out in a system under the control of this base station 10, in the registration and authentication table shown in FIG. 9 described above. Note that the terminal specific information and the public key cryptosystem information of the base station 10 itself as a terminal are also managed.

The timer setting unit 105 manages timers of the base station 10 used in the first to sixth embodiments described above, and controls start and finish of each timer.

The wireless communication unit 106 carries out exchange of information with terminals by wireless communications.

Wireless Terminal

Next, the wireless terminal to be used in the wireless communication system according to the embodiments of the present invention will be described.

Figure 29:
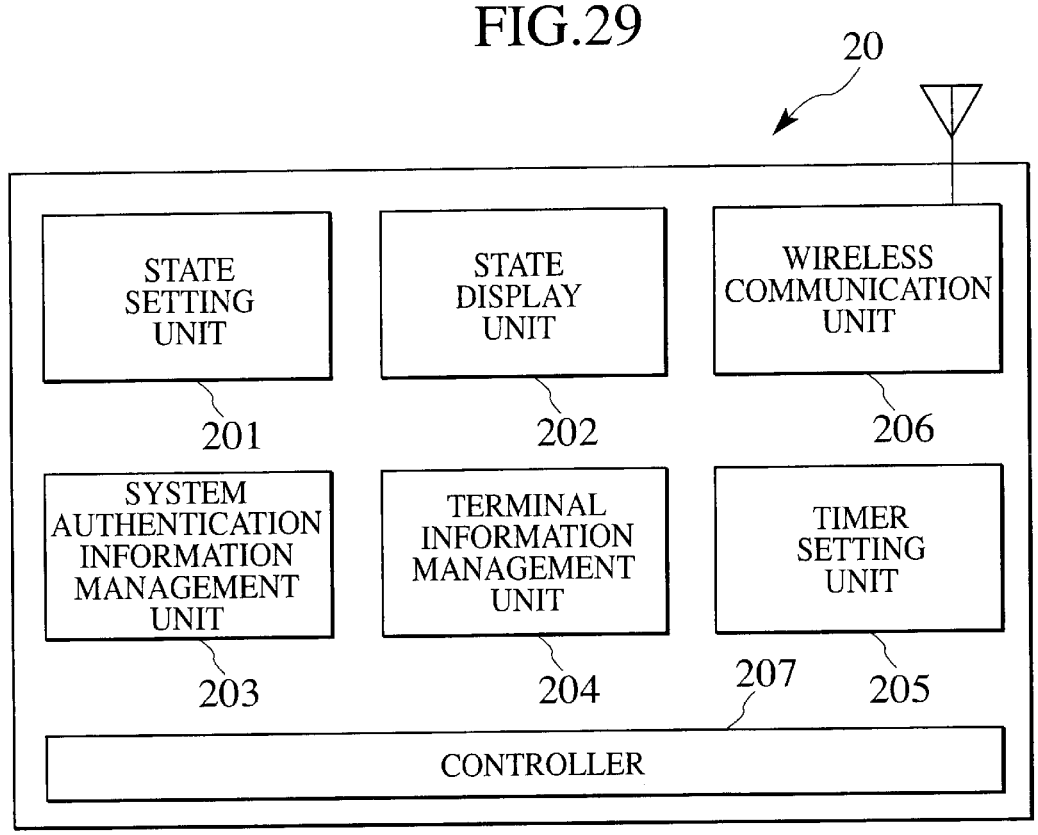
FIG. 29 is a block diagram showing an exemplary configuration of a wireless terminal in the wireless communication system according to the present invention.

FIG. 29 shows a configuration of the wireless terminal according to one embodiment of the present invention. As shown in FIG. 29, this terminal 20 comprises a state setting unit 201, a state display unit 202, a system authentication information management unit 203, a terminal information management unit 204, a timer setting unit 205, a wireless communication unit 206 and a controller 207.

The state setting unit 201 is in forms of buttons for the registration mode and the authentication mode, similarly as the state setting unit 101 of FIG. 28.

The state display unit 102 is the LED display, for example, similarly as the state display unit 102 of FIG. 28.

The system authentication information management unit 203 manages the secret key cryptosystem used in a system under the control of the base station which carried out the registration and authentication of this terminal 20. The secret key and the encryption algorithm of the secret key cryptosystem are managed, and there is a need to make them not easily readable from the external, similarly as the system authentication information management unit 103 of FIG. 28.

The terminal information management unit 204 manages the terminal specific information and the public key cryptosystem information for this terminal 20.

The timer setting unit 205 manages timers of the terminal 20 used in the first to sixth embodiments described above, and controls start and finish of each timer.

The wireless communication unit 206 carries out exchange of information with base stations by wireless communications.

Now, using the registration and authentication sequence #1 to #6 of the first to sixth embodiments described above, it is possible to carry out the registration and authentication of the terminal in the system managed by the base station as described above. By combining the manual operation of buttons or the like, the state display by the LED or the like, the public key cryptosystem and the secret key cryptosystem as in the present invention, it is possible to carry out the registration and authentication by the same wireless communications used for the ordinary data communications, and the user can easily judge the success or the failure through the state display. Also, it is difficult to operate the base station provided inside the home from the external, so that it is possible to realize the secure and easy registration and authentication even when the wireless communications are used.

Also, in the home wireless system, it is expected to be preferable to provide a plurality of base stations and enable flexible settings in arbitrary units such as individuals, groups, all family members, etc., and this can be realized by the present invention.

Figure 30:
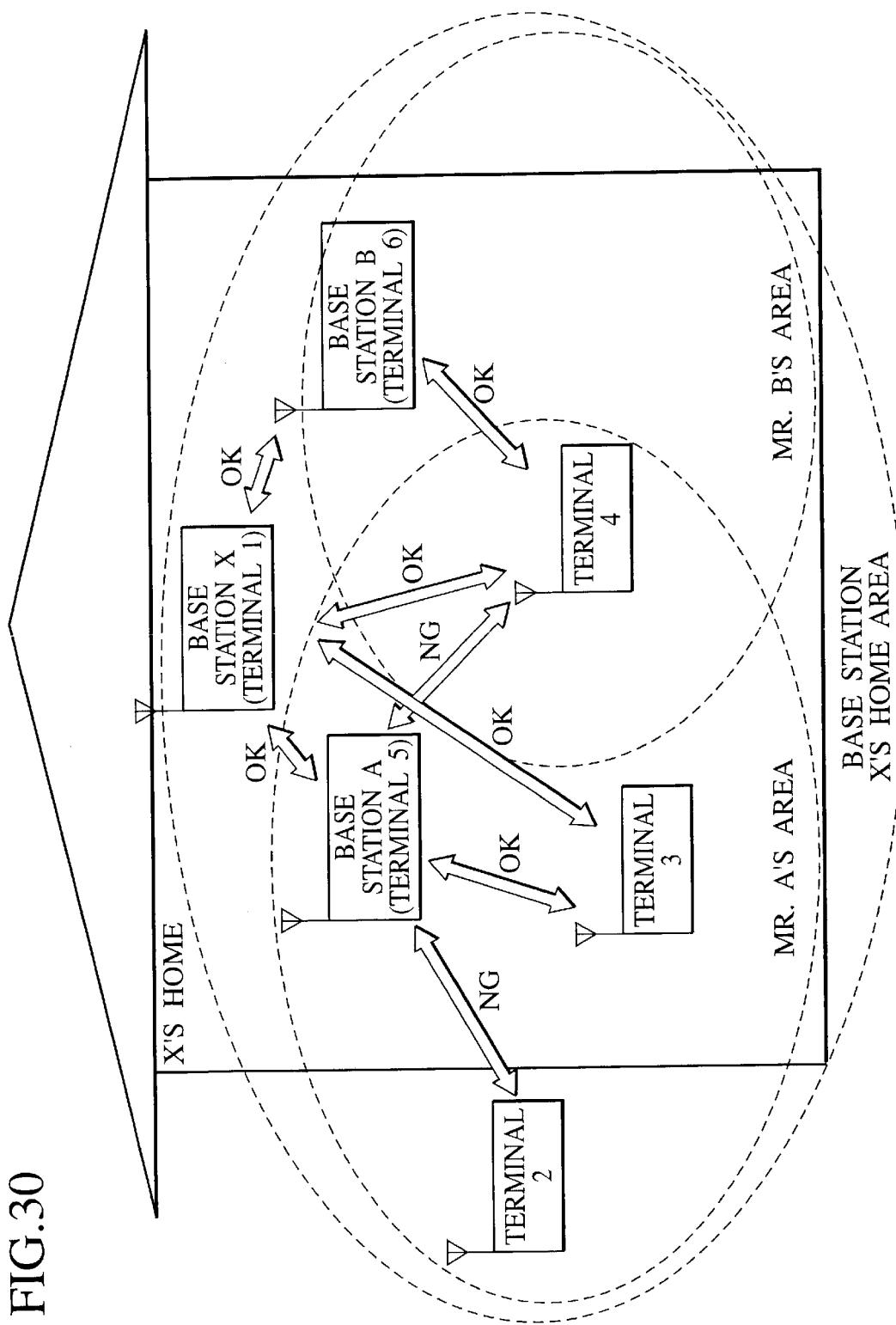
FIG. 30 is a schematic diagram showing another exemplary configuration of a wireless communication system according to the present invention.
Figure 31:
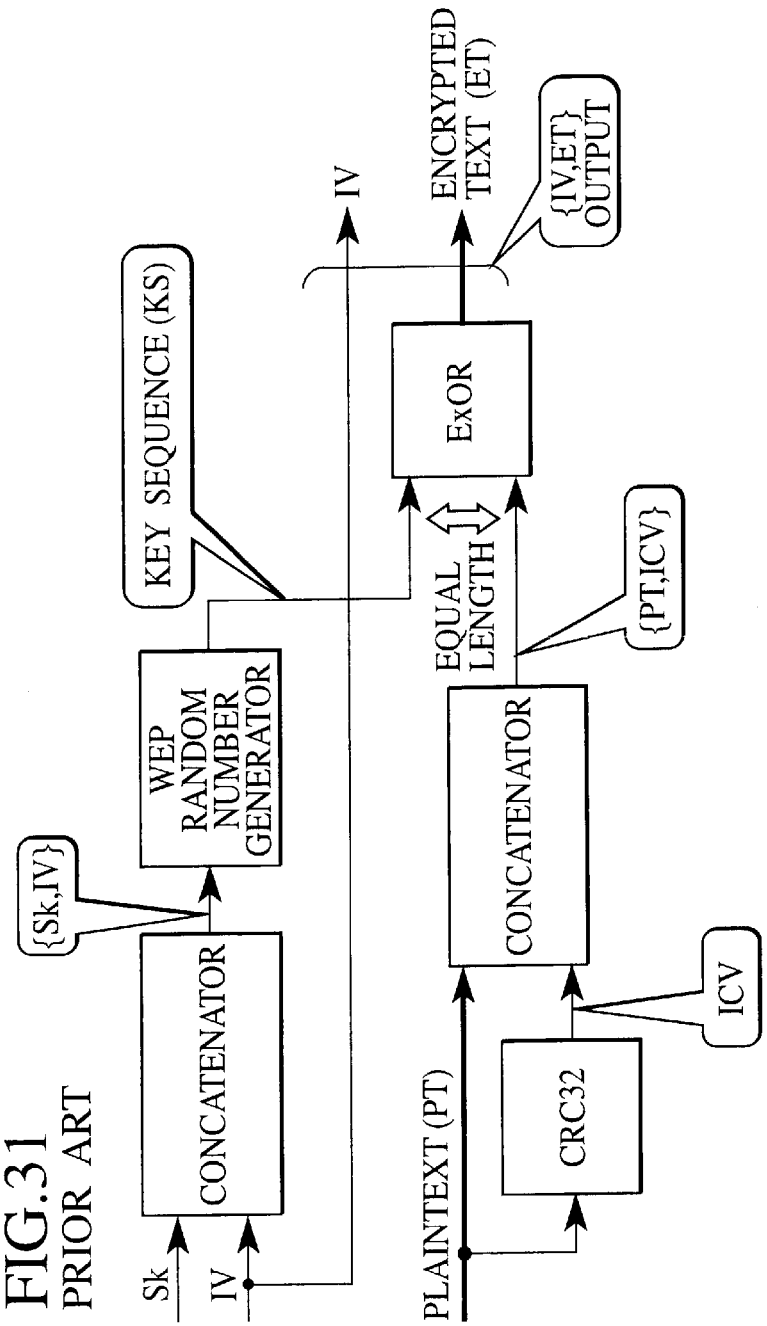
FIG. 31 is a diagram showing an encryption processing according to a WEP algorithm of IEEE 802.11.
Figure 32:
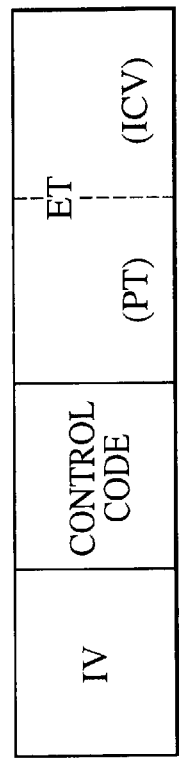
FIG. 32 is a diagram showing a communication data frame according to a WEP algorithm of IEEE 802.11.
Figure 33:
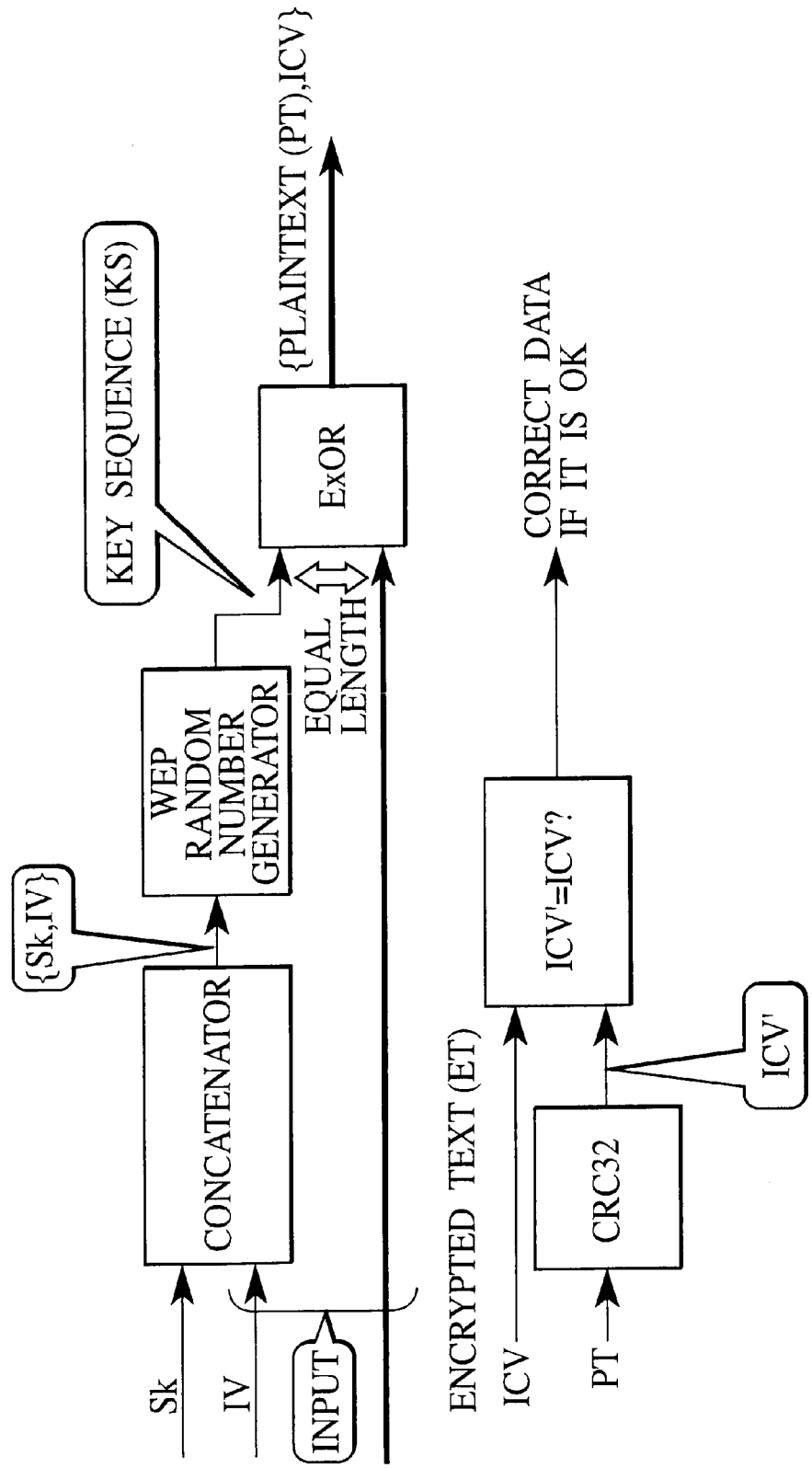
FIG. 33 is a diagram showing a decryption processing according to a WEP algorithm of IEEE 802.11.
Figure 34:
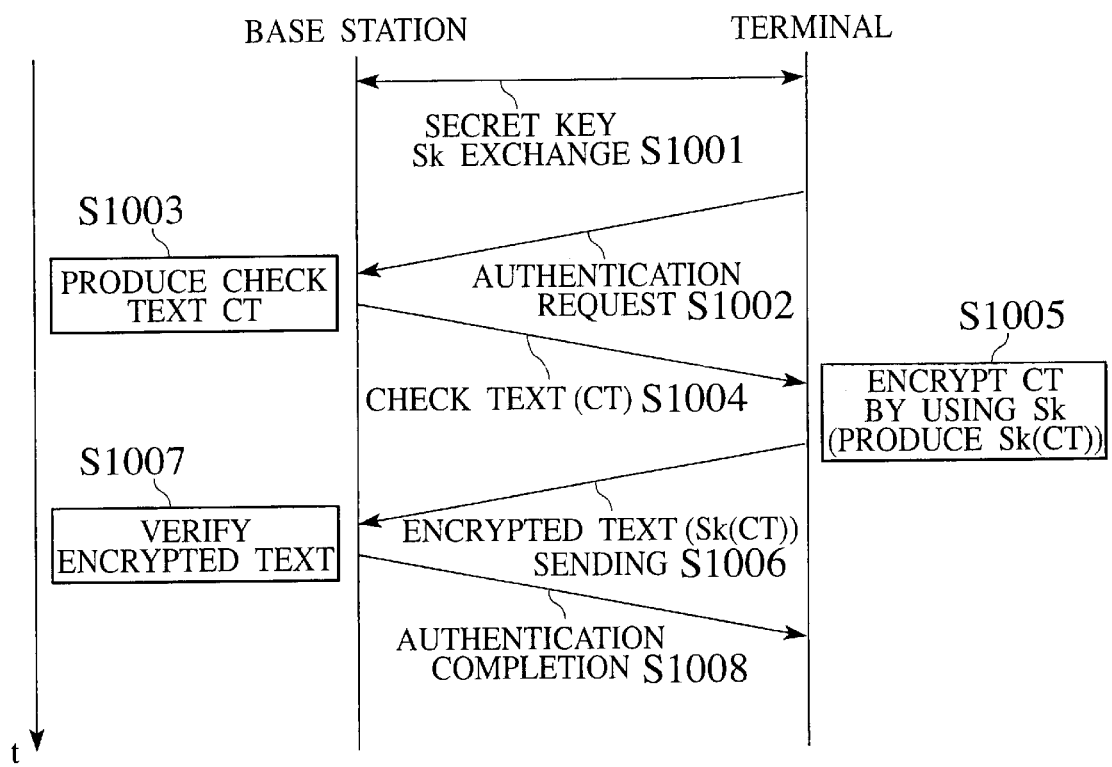
FIG. 34 is a sequence chart for an authentication processing according to a WEP algorithm of IEEE 802.11.

For example, there can be the case as shown in FIG. 30. Inside one home (X's home), a dedicated base station A for Mr. A, a dedicated base station B for Mr. B, and a base station X for all family members are provided. The base station A carries out the registration and authentication of only a terminal 3 of Mr. A, and refuses the registration and authentication of a terminal 2 that is passing by outside of the home or a terminal 4 of Mr. B that are within the area of the base station A. Similarly, the base station B carries out the registration and authentication of only the terminal 4 of Mr. B. The base station X carries out the registration and authentication of all the terminals within the X's home, including not only the terminal 3 and the terminal 4 but also the base station A and the base station B as terminals.

Note that, in such a case, only one type of normal mode for the terminal is used so that the registration and authentication of the terminal can be carried out at a plurality of base stations. Also, in such a case, each terminal manages the secret keys and the encryption algorithms of the secret key cryptosystems of a plurality of base stations in the system authentication information management unit. For example, the terminal 3 manages the secret keys and the encryption algorithms of the base station A and the base station X.

As described, in the registration and authentication scheme of the present invention, in the case of carrying out the registration and authentication of the wireless terminal with respect to the wireless base station provided inside the home, for example, the user of the wireless terminal must directly operate the wireless base station. For this reason, it is possible to prevent the registration and authentication of the wireless terminal of an external user who cannot easily operate the wireless base station, and thereby it is possible to realize the secure and easy registration and authentication processing even when the wireless communications are used.

Thus, according to the present invention, it is possible to realize the registration and authentication scheme which can be carried out securely and easily in the home wireless communication system.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for registration and authentication of a wireless terminal with respect to a wireless base station in a wireless communication system having the wireless base station and the wireless terminal for carrying out wireless communications with the wireless base station, the method comprising:
    (a) switching a mode of the wireless base station from a normal mode to a registration mode, as a user operates the wireless base station;
    (b) switching a mode of the wireless terminal from the normal mode to the registration mode, as the user operates the wireless terminal;
    (c) transmitting a registration request information containing a terminal public key specific to the wireless terminal, a terminal encryption scheme using the terminal public key, and a terminal identifier of the wireless terminal, from the wireless terminal to the wireless base station;
    (d) upon receiving the registration request information at the wireless base station, transmitting a registration confirmation information indicating a registration of the wireless terminal, from the wireless base station to the wireless terminal, the registration confirmation information being encrypted by using the terminal public key and the terminal encryption method at the wireless base station;
    (e) switching the mode of the wireless base station from the registration mode to an authentication mode;
    (f) when the wireless terminal correctly decrypts the registration confirmation information by using a terminal secret key corresponding to the terminal public key, switching the mode of the wireless terminal from the registration mode to the authentication mode;
    (g) after the mode of the wireless terminal is switched to the authentication mode, transmitting an authentication notice information containing a base station secret key specific to the wireless base station, a base station encryption scheme using the base station secret key, and a base station identifier of the wireless base station, from the wireless base station to the wireless terminal, the authentication notice information being encrypted by using the terminal public key and the terminal encryption scheme at the wireless base station;
    (h) when the wireless terminal correctly decrypts the authentication notice information by using the terminal secret key, transmitting an authentication acknowledgement information indicating a receipt of the authentication notice information from the wireless terminal to the wireless base station, the authentication acknowledgement information being encrypted by using the base station secret key and the base station encryption scheme at the wireless terminal, and switching the mode of the wireless terminal from the authentication mode to the normal mode; and
    (i) when the wireless base station correctly decrypts the authentication acknowledgement information by using the base station secret key, switching the mode of the wireless base station from the authentication mode to the normal mode.

2. The method of claim 1, wherein the step (c) takes places when the mode of the wireless terminal is switched from the normal mode to the registration mode; and
    the step (e) takes place upon the registration request information is received at the wireless base station.

3. The method of claim 1, wherein the step (c) takes places when the mode of the wireless terminal is switched from the normal mode to the registration mode; and
    the step (e) takes place after the mode of the wireless terminal is switched to the authentication mode, and as the user operates the wireless base station.

4. The method of claim 1, further comprising:
    (j) stopping the registration and authentication of the wireless terminal with respect to the wireless base station at the wireless base station, when the registration request information cannot be received from the wireless terminal within a first prescribed period of time after the mode of the wireless base station is switched from the normal mode to the registration mode, or when the authentication acknowledgement information cannot be received from the wireless terminal within a second prescribed period of time after the mode of the wireless base station is switched from the registration mode to the authentication mode; and
    (k) stopping the registration and authentication of the wireless terminal with respect to the wireless base station at the wireless terminal, when the registration confirmation information cannot be received from the wireless base station within a third prescribed period of time after the mode of the wireless terminal is switched from the normal mode to the registration mode, or when the authentication notice information cannot be received from the wireless base station within a fourth prescribed period of time after the mode of the wireless terminal is switched from the registration mode to the authentication mode.

5. The method of claim 4, wherein the step (j) manages the first prescribed period of time and the second prescribed period of time by using a first timer and a second timer provided at the wireless base station; and
    the step (k) manages the third prescribed period of time and the fourth prescribed period of time by using a third timer and a fourth timer provided at the wireless terminal.

6. The method of claim 1, further comprising:
    (f1) after the mode of the wireless terminal is switched to the authentication mode, transmitting an authentication request information indicating a request for authentication of the wireless terminal with respect to wireless base station, from the wireless terminal to the wireless base station, as the user operates the wireless terminal, the authentication request information being encrypted by using the terminal secret key and the terminal encryption scheme at the wireless terminal;
    wherein the step (c) takes places when the mode of the wireless terminal is switched from the normal mode to the registration mode;

the step (e) takes place upon the registration request information is received at the wireless base station; and the step (g) takes place when the wireless base station correctly decrypts the authentication request information by using the terminal public key.

7. The method of claim 6, further comprising:

(j) stopping the registration and authentication of the wireless terminal with respect to the wireless base station at the wireless base station, when the registration request information cannot be received from the wireless terminal within a first prescribed period of time after the mode of the wireless base station is switched from the normal mode to the registration mode, or when either the authentication request information or the authentication acknowledgement information cannot be received from the wireless terminal within a second prescribed period of time after the mode of the wireless base station is switched from the registration mode to the authentication mode; and (k) stopping the registration and authentication of the wireless terminal with respect to the wireless base station at the wireless terminal, when the registration confirmation information cannot be received from the wireless base station within a third prescribed period of time after the mode of the wireless terminal is switched from the normal mode to the registration mode, or when the authentication notice information cannot be received from the wireless base station within a fourth prescribed period of time after the mode of the wireless terminal is switched from the registration mode to the authentication mode.

8. The method of claim 7, wherein the step (j) manages the first prescribed period of time and the second prescribed period of time by using a first timer and a second timer provided at the wireless base station; and the step (k) manages the third prescribed period of time and the fourth prescribed period of time by using a third timer and a fourth timer provided at the wireless terminal.

9. The method of claim 1, further comprising:

(a1) transmitting a registration acceptance information indicating an acceptance of the registration of the wireless terminal with respect to the wireless base station, from the wireless base station to the wireless terminal, when the mode of the wireless base station is switched from the normal mode to the registration mode;

wherein the step (b) takes place before the step (a);

the step (c) takes place when the wireless terminal receives the registration acceptance information; and the step (e) takes place when the registration request information is received at the wireless base station.

10. The method of claim 9, further comprising:

(f1) transmitting an authentication request information indicating a request for authentication of the wireless terminal with respect to wireless base station, from the wireless terminal to the wireless base station, the authentication request information being encrypted by using the terminal secret key and the terminal encryption scheme at the wireless terminal;

wherein the step (g) takes place when the wireless base station correctly decrypts the authentication request information by using the terminal public key.

11. The method of claim 10, wherein the step (f1) takes place when the mode of the wireless terminal is switched from the registration mode to the authentication mode.

12. The method of claim 10, wherein the step (f1) takes place after the mode of the wireless terminal is switched to the authentication mode, and as the user operates the wireless terminal.

13. The method of claim 10, further comprising:

(j) stopping the registration and authentication of the wireless terminal with respect to the wireless base station at the wireless base station, when the registration request information cannot be received from the wireless terminal within a first prescribed period of time after the mode of the wireless base station is switched from the normal mode to the registration mode, or when either the authentication request information or the authentication acknowledgement information cannot be received from the wireless terminal within a second prescribed period of time after the mode of the wireless base station is switched from the registration mode to the authentication mode; and (k) stopping the registration and authentication of the wireless terminal with respect to the wireless base station at the wireless terminal, when either the registration acceptance information or the registration confirmation information cannot be received from the wireless base station within a third prescribed period of time after the mode of the wireless terminal is switched from the normal mode to the registration mode, or when the authentication notice information cannot be received from the wireless base station within a fourth prescribed period of time after the mode of the wireless terminal is switched from the registration mode to the authentication mode.

14. The method of claim 13, wherein the step (j) manages the first prescribed period of time and the second prescribed period of time by using a first timer and a second timer provided at the wireless base station; and the step (k) manages the third prescribed period of time and the fourth prescribed period of time by using a third timer and a fourth timer provided at the wireless terminal.

15. The method of claim 1, further comprising:

(a1) transmitting a registration acceptance information indicating an acceptance of the registration of the wireless terminal with respect to the wireless base station, from the wireless base station to the wireless terminal, when the mode of the wireless base station is switched from the normal mode to the registration mode;

wherein the step (b) takes place before the step (a);

the step (c) takes place when the wireless terminal receives the registration acceptance information;

the step (e) takes place after the mode of the wireless terminal is switched to the authentication mode, and as the user operates the wireless base station; and the step (g) takes place when the mode of the wireless base station is switched from the registration mode to the authentication mode.

16. The method of claim 15, further comprising:

(j) stopping the registration and authentication of the wireless terminal with respect to the wireless base station at the wireless base station, when the registration request information cannot be received from the wireless terminal within a first prescribed period of time after the mode of the wireless base station is switched from the normal mode to the registration mode, or when the authentication acknowledgement information cannot be received from the wireless terminal within a second prescribed period of time after the mode of the wireless base station is switched from the registration mode to the authentication mode; and (k) stopping the registration and authentication of the wireless terminal with respect to the wireless base station at the wireless terminal, when either the registration acceptance information or the registration confirmation information cannot be received from the wireless base station within a third prescribed period of time after the mode of the wireless terminal is switched from the normal mode to the registration mode, or when the authentication notice information cannot be received from the wireless base station within a fourth prescribed period of time after the mode of the wireless terminal is switched from the registration mode to the authentication mode.

17. The method of claim 16, wherein the step (j) manages the first prescribed period of time and the second prescribed period of time by using a first timer and a second timer provided at the wireless base station; and the step (k) manages the third prescribed period of time and the fourth prescribed period of time by using a third timer and a fourth timer provided at the wireless terminal.

18. The method of claim 1, wherein at the step (h), the mode of the wireless terminal is switched to the normal mode indicating that the wireless terminal is already registered as the registration and authentication of the wireless terminal with respect to the wireless base station is completed.

19. The method of claim 1, further comprising:

(j) switching the mode of the wireless terminal among the normal mode, the registration mode, and the authentication mode according to a mode switching request entered by the user.

20. The method of claim 1, further comprising:

(j) switching the mode of the wireless base station among the normal mode, the registration mode, and the authentication mode according to a mode switching request entered by the user.

<

\* \* \* \* \*